(12) United States Patent
Howard et al.

(10) Patent No.: US 7,931,505 B2
(45) Date of Patent: Apr. 26, 2011

(54) PORTABLE DEVICE INTERFACING

(75) Inventors: Damian Howard, Winchester, MA (US); Bruce Lee, Ashland, MA (US)

(73) Assignee: Bose Corporation

( * ) Notice: Subject to any disclaimer, the term of this patent is extended or adjusted under 35 U.S.C. 154(b) by 330 days.

(21) Appl. No.: 12/169,767

(22) Filed: Jul. 9, 2008

(65) Prior Publication Data

US 2009/0130884 A1 May 21, 2009

Related U.S. Application Data

(60) Provisional application No. 60/988,175, filed on Nov. 15, 2007.

(51) Int. Cl.
H01R 13/643 (2006.01)
(52) U.S. Cl. ............. 439/680; 361/679.55; 296/24.34
(58) Field of Classification Search .......... 439/680, 439/362; 361/679.55; 296/24.34
See application file for complete search history.

(56) References Cited

U.S. PATENT DOCUMENTS

| | | | |
|---|---|---|---|
| 3,071,728 A | 1/1963 | Grace et al. |
| 4,733,356 A | 3/1988 | Haeussermann et al. |
| 4,843,299 A | 6/1989 | Hutchings |
| 5,187,744 A | 2/1993 | Richter |
| 5,319,716 A | 6/1994 | McGreevy |
| 5,394,333 A | 2/1995 | Kao |
| 5,459,824 A | 10/1995 | Kashiwazaki |
| 5,483,517 A | 1/1996 | Kurata et al. |
| 5,535,274 A | 7/1996 | Braitberg et al. |
| 5,537,673 A | 7/1996 | Nagashima et al. |
| 5,541,490 A | 7/1996 | Sengupta et al. |
| 5,554,919 A | 9/1996 | Uchida et al. |
| 5,560,481 A | 10/1996 | Doodson et al. |
| 5,745,565 A | 4/1998 | Wakefield |
| 5,794,164 A | 8/1998 | Beckert et al. |
| 5,797,088 A | 8/1998 | Stamegna |
| 5,808,373 A | 9/1998 | Hamanishi et al. |
| 5,870,710 A | 2/1999 | Ozawa et al. |
| 5,949,218 A | 9/1999 | Colles et al. |
| 5,974,333 A | 10/1999 | Chen et al. |
| 5,991,640 A | 11/1999 | Lilja et al. |
| 6,061,306 A | 5/2000 | Buchheim et al. |
| 6,084,963 A | 7/2000 | Hirai et al. |
| 6,091,359 A | 7/2000 | Geier |
| 6,124,826 A | 9/2000 | Garthwaite et al. |
| 6,125,326 A | 9/2000 | Ohmura et al. |

(Continued)

FOREIGN PATENT DOCUMENTS

DE 20 2004 011 331 11/2004

(Continued)

OTHER PUBLICATIONS

European Examination Report for App. No. 06784537.0, dated Jul. 22, 2009.

(Continued)

*Primary Examiner* — Truc T Nguyen

(57) ABSTRACT

A portable device interfacing system for use in a vehicle or other environments permits a portable device to be removably connected with another system, such as an audio system. The portable device interfacing system may include features that help to prevent liquid from damaging electronics of the system, align physical connections between the interfacing system and the portable device, safely secure the portable device in position, and/or permit the system to be expanded to support different portable devices.

23 Claims, 20 Drawing Sheets

U.S. PATENT DOCUMENTS

| | | | |
|---|---|---|---|
| 6,170,060 B1 | 1/2001 | Mott et al. | |
| 6,253,982 B1 | 7/2001 | Gerardi | |
| 6,341,218 B1 | 1/2002 | Poplawsky et al. | |
| 6,367,022 B1 | 4/2002 | Gillespie et al. | |
| 6,370,037 B1 | 4/2002 | Schoenfish | |
| 6,396,164 B1 | 5/2002 | Barnea et al. | |
| 6,407,750 B1 | 6/2002 | Gioscia et al. | |
| 6,417,786 B2 | 7/2002 | Learman et al. | |
| 6,427,115 B1 | 7/2002 | Sekiyama et al. | |
| 6,434,459 B2 | 8/2002 | Wong et al. | |
| 6,456,046 B1 | 9/2002 | Gaza | |
| 6,608,399 B2 | 8/2003 | McConnell et al. | |
| 6,622,083 B1 | 9/2003 | Knockeart et al. | |
| 6,633,482 B2 | 10/2003 | Rode | |
| 6,681,176 B2 | 1/2004 | Funk et al. | |
| 6,719,343 B2 * | 4/2004 | Emerling et al. | 296/24.34 |
| 6,762,585 B2 | 7/2004 | Liao et al. | |
| 6,772,212 B1 | 8/2004 | Lau et al. | |
| 6,782,239 B2 | 8/2004 | Johnson et al. | |
| 6,785,531 B2 | 8/2004 | Lepley et al. | |
| 6,788,528 B2 | 9/2004 | Enners et al. | |
| 6,816,783 B2 | 11/2004 | Hashima et al. | |
| 6,824,063 B1 | 11/2004 | Wallace et al. | |
| 6,937,732 B2 | 8/2005 | Ohmura et al. | |
| 6,939,155 B2 | 9/2005 | Postrel | |
| 7,062,238 B2 | 6/2006 | Glaza | |
| 7,084,932 B1 | 8/2006 | Mathias et al. | |
| 7,102,415 B1 | 9/2006 | Potanin et al. | |
| 7,107,472 B2 | 9/2006 | Weinold | |
| 7,123,719 B2 | 10/2006 | Sowa et al. | |
| 7,127,332 B2 | 10/2006 | Strohmeier et al. | |
| 7,239,961 B2 | 7/2007 | Banet et al. | |
| 7,269,002 B1 * | 9/2007 | Turner et al. | 361/679.55 |
| 7,333,478 B2 | 2/2008 | Wiebe | |
| 7,349,772 B2 | 3/2008 | Delaney et al. | |
| 7,441,062 B2 | 10/2008 | Novotney et al. | |
| D600,680 S * | 9/2009 | Mead et al. | D14/217 |
| 2002/0147037 A1 | 10/2002 | Kwon | |
| 2002/0154766 A1 | 10/2002 | Campos | |
| 2002/0197955 A1 | 12/2002 | Witkowski et al. | |
| 2003/0045265 A1 | 3/2003 | Huang et al. | |
| 2003/0120844 A1 | 6/2003 | Hamel | |
| 2003/0128504 A1 | 7/2003 | Enners et al. | |
| 2003/0156097 A1 | 8/2003 | Kakihara et al. | |
| 2003/0208314 A1 | 11/2003 | Funk et al. | |
| 2003/0233409 A1 | 12/2003 | Awada et al. | |
| 2004/0045265 A1 | 3/2004 | Bartoli et al. | |
| 2004/0091123 A1 | 5/2004 | Stark et al. | |
| 2004/0117442 A1 | 6/2004 | Thielen | |
| 2004/0121748 A1 | 6/2004 | Glaza | |
| 2004/0151327 A1 | 8/2004 | Marlow | |
| 2004/0224638 A1 | 11/2004 | Fadell et al. | |
| 2005/0047081 A1 | 3/2005 | LaPorte et al. | |
| 2005/0049002 A1 | 3/2005 | White et al. | |
| 2005/0076058 A1 | 4/2005 | Schwesig et al. | |
| 2005/0096018 A1 | 5/2005 | White et al. | |
| 2005/0147951 A1 * | 7/2005 | Rohrbach | 434/307 R |
| 2005/0286546 A1 | 12/2005 | Bassoli et al. | |
| 2006/0010167 A1 | 1/2006 | Grace et al. | |
| 2006/0072525 A1 | 4/2006 | Hillyard et al. | |
| 2006/0134959 A1 | 6/2006 | Ellenbogen | |
| 2006/0229811 A1 | 10/2006 | Herman et al. | |
| 2006/0270395 A1 | 11/2006 | Dhawan et al. | |
| 2006/0277555 A1 * | 12/2006 | Howard et al. | 720/600 |
| 2007/0129006 A1 | 6/2007 | Goldberg et al. | |
| 2007/0140187 A1 | 6/2007 | Rokusek et al. | |
| 2007/0198862 A1 | 8/2007 | Sato et al. | |
| 2007/0203641 A1 | 8/2007 | Diaz et al. | |
| 2007/0265769 A1 | 11/2007 | Geelen et al. | |
| 2007/0266344 A1 | 11/2007 | Olcott et al. | |
| 2008/0147308 A1 | 6/2008 | Howard et al. | |
| 2008/0147321 A1 | 6/2008 | Howard et al. | |
| 2008/0215240 A1 | 9/2008 | Howard et al. | |

FOREIGN PATENT DOCUMENTS

| | | |
|---|---|---|
| DE | 10321837 | 12/2004 |
| EP | 0552939 | 7/1993 |
| EP | 0870648 | 10/1998 |
| EP | 1566305 | 8/2005 |
| EP | 1602897 | 12/2005 |
| FR | 2721738 | 12/1995 |
| WO | 9967761 | 12/1999 |
| WO | 0038951 | 7/2000 |
| WO | 0237446 | 5/2002 |
| WO | 02094614 | 11/2002 |
| WO | 2006010660 | 2/2006 |

OTHER PUBLICATIONS

ALPINE Mobile Media Solutions 2007 Spring Solutions Brochure.

International Preliminary Report on Patentability dated Mar. 27, 2009, issued in International Application No. PCT/US2007/087989, filed Dec. 18, 2006.

ALPINE blackbird• PMD-B100T Version 1.2 Owner's Manual, Printed Sep. 13, 2006.

ALPINE blackbird•, <http://www.blackbirdnav.com>, downloaded Aug. 20, 2007.

International Search Report and Written Opinion dated May 28, 2008 for PCT/US07/087974.

International Preliminary Report on Patentability dated Apr. 8, 2009, issued in PCT/US2007/087974 filed Dec. 18, 2007.

International Search Report and Written Opinion dated May 28, 2008 for PCT/US07/87989.

Gizmodo, "Eclipse AVN2210 Car Stereo with Ejectable TomTom GPS," <http://gizmodo.com/gadgets/car/eclipse-avn2210-car-stereo-with-ejectable-tomtom-gps-22>... downloaded Aug. 20, 2007.

Fujitsu Ten Press Release, "Detachable navigation section integrates into double-DIN unit as the AVN2210p, poised for sales to start in North America as an ECLIPSE Product," posted Jan. 9, 2007 on <http://www.fujitsu-ten.co.jp/english/release/2007/01/20070109_e.html> downloaded Aug. 20, 2007.

Eclipse AVN2210 Car Stereo with Ejectable TomTom (posted Jan. 6, 2007) (downloaded May 22, 2007) <http://gizmodo.com/gadgets/car/eclipse-avn2210-car-stereo-with-ejectable-tomtom-gps-226628.php>.

Gadgetell—Tech News, Reviews, and Interesting Things, "CES Unveiled: Eclipse and TomTom play friendly together in your car," (posted Jan. 6, 2007) (downloaded May 21, 2007) <http://www.gadgetell.com/2007/01/eclipes-and-tomtom-play-friendly-together-in-your-car/>.

TomTom, Portable GPS Car Navigation Systems, "The Eclipse AVN 2210p Honored as Consumer Electronics Innovator at CES 2007," (posted Jan. 11, 2007) (downloaded May 21, 2007) <http://www.tomtom.com/news/category.php?ID=4&NID=334&Year=2007&Language=4>....

Fujitsu Ten, "Detachable navigation section integrates into double-DIN unit as the AVN2210p, poised for sales to start in North America as an ECLIPSE Product," (posted Jan. 9, 2007) (downloaded May 21, 2007) <http://www.fujitsuten.co.jp/english.release /2007/01/20070109_e.html>.

Eclipse AVN2210p In-Dash Portable Navigation with CD/USB Multi-Source Receiver Brochure, Printed 2007.

Alpha Romeo, Ipod Pack, http://www.alfaromeo.com/cgi-bin/pbrand.dll/ALFAROMEOCOM/models/models.jsp?BV_Sess..., Printed Sep. 12, 2005.

Alfa Romeo, Mac World 2005, http://www.alfaromeo.com/cgi-bin/pbrand.dll/ALFAROMEO_COM/news/news.jsp?BV_Session ID ..., Jan. 11, 2005.

Belkin Connecting People with Technology, Leather Holster for iPod w/Dock /Connector, http://catalog.belkin.com?IWC-CatProductPage.process?Merchant_id=&Section_Id=201526..., Printed Apr. 25, 2005.

Apple—iPod Your BMW, http://www.apple.com/ipod/bmw/, printed Apr. 25, 2005.

iPod Netalog Every-Thing, DLO TransPod FM, http://everythingipod.com/TFM.tpl?command=showpage&cart=11144557433956327&db..., Printed Apr. 25, 2005.

iPod Netalog Every-Thing, http://everythingipod.com/drilldown88.tpl?command=search&db=dbs/products.db&cart=1...,Printed Apr. 25, 2005.

PodGear CarDock FM (Car Accessories for iPod), http://shop.ipodworld.co.uk/ipodworldsite/pages/rpduct/product.asp?prod=PG01&ctgry..., Printed Apr. 25, 2005.

Haus of pods your home for ipod accessories, http://www.hauseofpods.com/automotiv.shtml, Printed Apr. 25, 2005.

Crutchfield.com, I want to connect my iPod to my factory radio, http://www.crutchfield.com/S-JeOeMJFTjkQ/ipod/inthecar.html, Printed Apr. 25, 2005.

PlayForSure—more music, more choices, http://www.playforsure.com/, Printed Jun. 1, 2005.

International Search Report and Written Opinion dated Feb. 13, 2007, issued in International Patent Application US2006/021352.

* cited by examiner

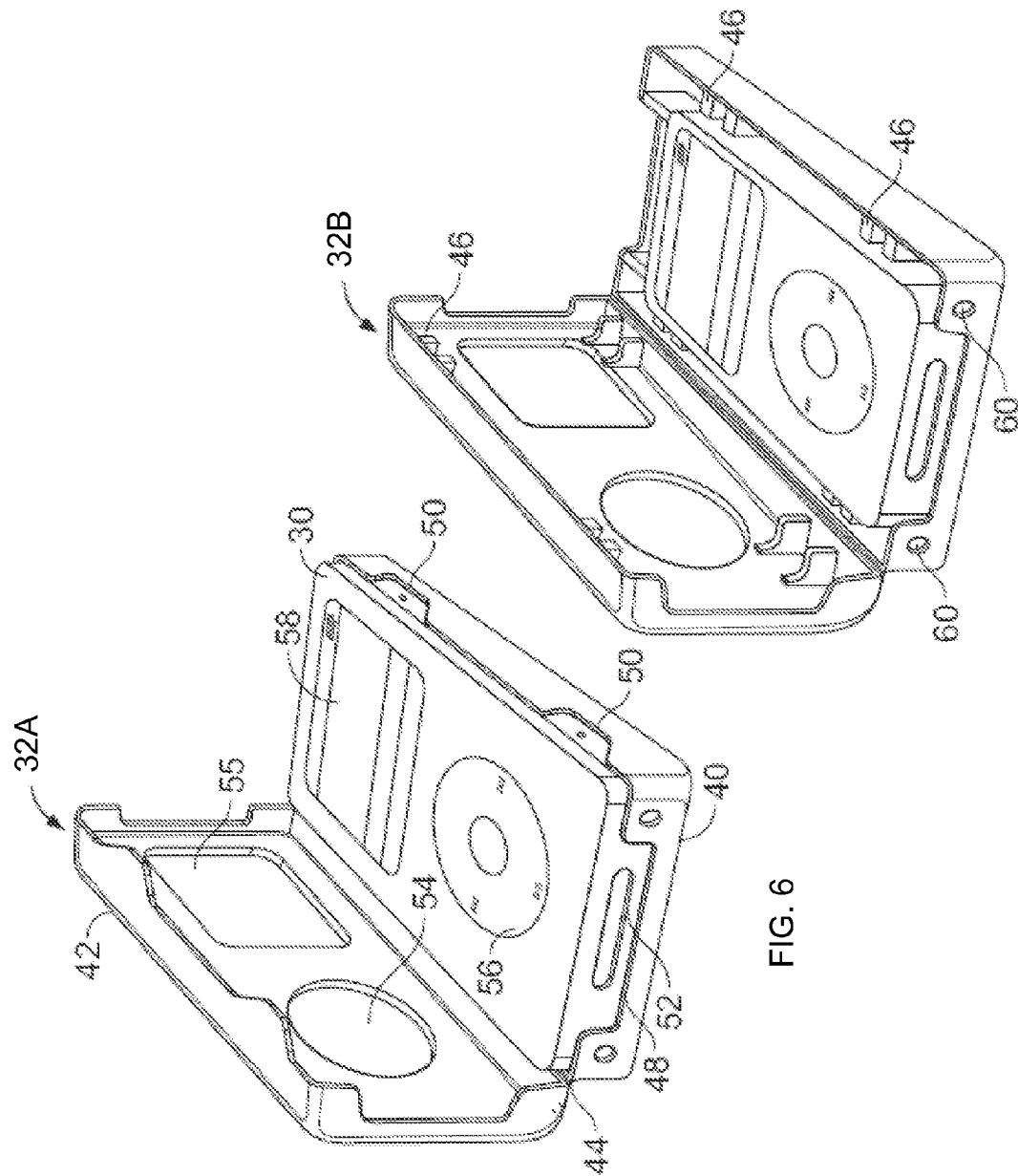

PORTABLE DEVICE INTERFACING

CROSS REFERENCE TO RELATED APPLICATIONS

This U.S. patent application claims priority under 35 U.S.C. §119(e) to U.S. Provisional Application 60/988,175, filed on Nov. 15, 2007. The disclosure of the prior application is considered part of the disclosure of this application and is incorporated herein by reference in its entirety.

TECHNICAL FIELD

This description relates to portable device interfacing.

BACKGROUND

Digital portable media players can store large volumes of files, play music, display images and perform film clips using audio compression and video compression formats such as MP3, WMA, OGG, FLAC, MPEG-4, AA, ASF, MP4, AAC, JPEG, BMP, GIF, TIFF, PSD and PNG.

Some portable media players can be interfaced with audio or video systems in automobiles, for example, by coupling the analog audio output from a line-out or headphone-out jack to the vehicle media system (e.g., using a radio transmitter) or by connecting player's data port to the vehicle media system.

In another coupling arrangement, a cassette adapter is plugged into the portable device and inserted into a cassette deck in the vehicle, which picks up music from the player through the playback heads in the cassette deck.

Alternatively, a mini (3.5 mm) stereo headphone jack-to-stereo RCA cable or mini stereo-to-mini stereo cable can be connected between the line-out or headphone-out of the player and an auxiliary input of the vehicle media system, or in the absence of an auxiliary input, to a CD changer port.

Using a data port of the player as an interface to the vehicle media system may be done using a conventional Universal Serial Bus (USB) 2.0 or an IEEE 1394 FireWire 400 cable, or for some players a device specific adapter cable. Connecting the portable device using a USB or FireWire cable allows the portable device to be controlled by a CD interface or a head unit in the vehicle media system equipped with the drivers to support the USB or FireWire connection.

Microsoft's PlaysForSure® standard attempts to assure that a file compatible with the standard will be playable on a standard-compatible player without requiring multiple device-specific drivers.

Some vehicle media systems include data port portable device adapters that simulate CD changer functions, allowing users to move between and view track numbers in playlists and to skip between tracks using "Up" and "Down" arrows or play the contents of the portable device in "Random" mode.

Video players may be connected to a vehicle media system connecting a composite video and audio line out to a respective pair of connectors in the vehicle media system.

SUMMARY

In one aspect, a portable device receiving unit includes a receptacle defining an interior space configured to receive a portable media player. The interior space an interior bottom surface that includes an upper portion that extends into the interior space and a lower portion that is below the upper portion. The portable device receiving unit includes a coupler to provide electrical connection between the portable media player and a vehicle media system. The coupler is disposed on the upper portion of the interior bottom surface. The interior space defines at least one drain hole disposed in the lower portion of interior bottom surface.

Implementations of this aspect of the disclosure may include one or more of the following features. In some examples, the interior bottom surface defines a generally convex shape and the upper portion is a portion toward the peak of the convex shape and the lower portion is a portion toward the bottom of the convex shape. The portable device receiving unit may include a drain tube in fluid communication with the at least one drain hole. The portable device holder is disposed in an interior region of the vehicle. The drain tube is in fluid communication with an exterior region outside of a vehicle and/or a reservoir. The receptacle may be integrated with an element of interior finish work of a vehicle. The element of interior finish work may include at least one of an armrest, a sun visor, a rearview mirror, a dashboard, a seat, a door, a console, a glove compartment, a headrest, and a head unit of a vehicle media system. Preferably, the receptacle is a cup or cup holder. The receptacle is configured to receive a portable device holder housing the portable media player. The portable media player may comprise a music player and/or video player.

In another aspect, a portable device interfacing system includes a portable device holder and a portable device receiving unit. The portable device holder includes a holder body defining a cavity configured to receive a portable media player and a first coupler to provide electrical connection with the portable media player. The portable device receiving unit includes a receptacle defining an interior space configured to receive the portable device holder. The interior space has an interior bottom surface that protrudes into the interior space and a second coupler to provide electrical connection between the first coupler of the received portable device holder and a vehicle media system. The second coupler is disposed on the protruding interior bottom surface. The interior space defines at least one drain hole in the interior bottom surface. In some implementations, the interior bottom surface of the receptacle is defined as a convex shape to receive a bottom surface of the holder body defined as a concave shape.

In yet another aspect, a portable device receiving unit includes a receptacle defining an interior space configured to receive a portable media player and a coupler to provide electrical connection between the received portable media player and a vehicle media system. The coupler is disposed on an interior bottom surface defined by the interior space of the receptacle. A cover is pivotally attached to the interior bottom surface and is operable to move among an open position exposing the coupler for electrical connection and a closed position separating the coupler from the interior space.

Implementations of this aspect of the disclosure may include one or more of the following features. In some examples, the portable device receiving unit includes a compliant seal disposed along a perimeter of the cover. The interior space of the receptacle defines a coupler cavity that houses the coupler. The cover is configured to seal the coupler in the coupler cavity while in the closed position. In some examples, a compliant seal is disposed along an edge of the coupler cavity to engage a surface of the closed cover. The receptacle is configured to receive a portable device holder housing the portable media player.

In another aspect, a portable media player holder includes a holder body defining a holder cavity configured to receive a portable media player and a first coupler disposed in the holder cavity for electrical connection with the received portable media player. The portable media player holder includes a second coupler in electrical connection with the first coupler and is disposed in a coupler cavity defined in a bottom surface of the holder body. The second coupler is operable to move among a retracted position in the coupler cavity and a deployed position at least partially out of the coupler cavity for electrical connection between the received portable media player and a third, mating coupler in electrical connection with a vehicle media system. A door is pivotally attached to the bottom surface and is operable to move among an open position exposing the coupler for electrical connection and a closed position separating the coupler in the coupler cavity.

Implementations of this aspect of the disclosure may include one or more of the following features. In some examples, the portable media player holder of claim includes a compliant seal disposed along a perimeter of the door. In other examples, a compliant seal is disposed along an edge of the coupler cavity to engage a surface of the closed door.

In another aspect, a portable device interfacing system includes a portable device holder and a portable device receiving unit. The portable device holder includes a holder body defining a cavity configured to receive a portable media player and a first coupler to provide electrical connection with the portable media player. The portable device receiving unit includes a receptacle defining an interior space configured to receive the portable device holder and a second coupler to provide electrical connection between the first coupler of the received portable device holder and a vehicle media system. The second coupler is disposed on an interior bottom surface defined by the interior space of the receptacle. An alignment system is configured to orient the received portable device holder with respect to the receptacle.

Implementations of this aspect of the disclosure may include one or more of the following features. In some examples, the alignment system includes at least two guides defined by the holder body and arranged asymmetrically with respect to a mid-plane bisecting the holder body. The asymmetrically arranged guides are configured to orient the first coupler of the received portable device holder with the second coupler. The guides may include ribs. In some examples, the alignment system includes at least two guides defined by the interior space and arranged asymmetrically with respect to a mid-plane bisecting the receptacle. The asymmetrically arranged guides are configured to orient the first coupler of the received portable device holder with the second coupler. In some cases, the interior bottom surface defines the guides. In some implementations, the alignment system includes a bottom portion of the interior space that defines an asymmetric shape to receive a mating portion of the portable device holder. The asymmetric shape is designed to orient the first coupler of the portable device holder relative to the second coupler. The connectors may be selectively hidden or withdrawn by twisting one portion of the cup relative to another portion of the cup.

In another aspect, a portable device receiving unit includes a frame configured to receive a portable media player, connection elements to provide electrical connection between the portable media player and a vehicle media system, and at least two guides disposed asymmetrically with respect to a mid-plane bisecting the frame to align the received portable media player with the connection elements.

In another aspect, a portable device receiving unit includes a receptacle defining an interior space configured to receive a portable media player holder and a coupler to provide electrical connection between the received portable media player holder and a vehicle media system. The interior space defines at least two alignment features asymmetrically positioned with respect to a mid-plane bisecting the receptacle and configured to orient the received portable device holder with respect to the receptacle.

In another aspect, a portable media player holder includes a holder body defining a cavity configured to receive a portable media player and a first coupler disposed in the cavity for electrical connection with the portable media player. A converter circuit is housed in the holder body and is in electrical connection with the first coupler. A second coupler is in electrical connection with the converter circuit and is disposed on the holder body for electrical connection with a vehicle media system. The converter circuit provides communication between the received portable media player and the connected vehicle media system.

Implementations of this aspect of the disclosure may include one or more of the following features. In some examples, the holder body includes a cup defining an electronics chamber in a bottom portion of the cup. The converter circuit is housed in the electronics chamber. The holder body may include first and second body portions cooperatively associated to house the received portable media player. The first and second body portions are pivotally attached to each other, in some examples. The cavity of the holder body may define ribs to support the received portable media player. The holder body defines a user access opening for a user to access to a user interface of the portable media player.

In yet another aspect, a portable device receiving unit includes a frame configured to receive a portable media player and connection elements to provide electrical connection between the portable media player and a vehicle media system. A door is operable to move between an open position and a closed position. The open position allows the ingress and egress of the portable media player to and from the frame. The closed position prevents the portable media player from exiting the frame.

Implementations of this aspect of the disclosure may include one or more of the following features. In some examples, the door is pivotally attached to the frame. In other examples, the door is slidably attached to the frame. The door may be spring biased to the closed position. The frame includes a receptacle defining an interior space configured to receive the portable media player. The frame may be configured to receive a portable media player holder housing the portable media player.

In some implementations, the receptacle of the portable device receiving unit includes a frame having walls that envelop the received portable media player. The frame includes a locking mechanism operable to hold the portable media player in the frame and a user-operable release mechanism to release the portable media player from the frame. The frame is configured to be mounted in a 0.5DIN, 1DIN, 1.5DIN, 2DIN, or 2.5DIN option bay of a vehicle.

The couplers (e.g. connectors) are configured to conform to a communication bus of the vehicle. The bus may include a multimedia fiber-optic point-to-point network (e.g., a MOST bus), a 2-wire interface (e.g., a CAN bus), or any other bus known in the automotive field.

The portable device receiving unit may include a guide system that guides the portable media player into the receptacle. The guide system may include driven wheels, rollers, rails, and tracks. A biasing device biases the guide system against the portable media player or a portable case holding the portable media player.

The connection elements create an electrical connection between a portable media player and a vehicle media system when the portable media player is placed in the frame. Further, the frame may include a guide to align the portable media player with the connection elements when the portable media player is received in the frame. The guides may be wheels, rollers, rails, or tracks. The guides may be biased to accept different sized portable devices. Further, the guides may be motorized to insert or eject a portable device. The frame may be mounted in a DIN slot in a vehicle. The connection elements are configured to communicate with a MOST bus of the vehicle.

Other features, objects, and advantages of the invention will be apparent from the description and drawings, and from the claims.

DESCRIPTION OF DRAWINGS

FIG. 6 is a perspective view of a portable media player holder with a received media player.
FIG. 7 is a perspective view of a portable media player holder with internal ribs supporting a received media player.

DETAILED DESCRIPTION

Figure 1:
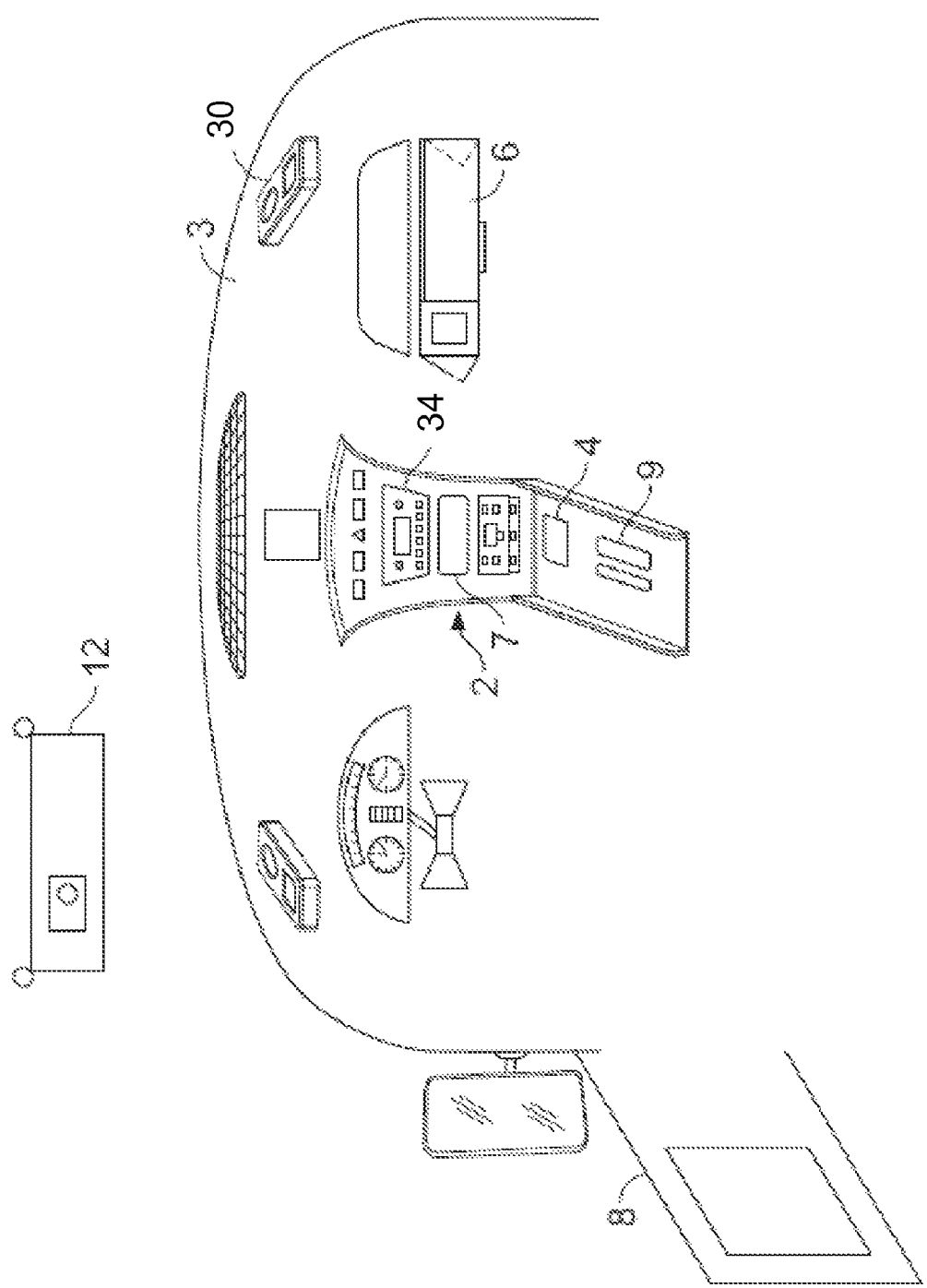
FIG. 1 is a schematic view of a vehicle interior.

Referring to FIG. 1, a portable device 30 can be integrated with a vehicle media system 2 in a variety of locations, each offering one or more advantages, such as ease of use, line of sight visibility, or avoiding clutter in the vehicle. A portable device may include a portable media player or any other kind of portable electronic device that performs functions that could be integrated with electronic devices that are part of the vehicle. Such functions could relate, for example, to global positioning systems (GPS), to running software applications, or to internal vehicle environmental controls or other functions. Integrating, in this context, includes temporarily coupling the portable device mechanically and/or electronically or both to the vehicle, its media system, and its interior surfaces or elements. When the portable device has been integrated, the portable device may then be de-integrated by decoupling it from the vehicle media system. In other words, the portable device can be used in both a portable mode and in a mode in which it has been temporarily integrated into the vehicle in a way that mechanically and/or electronically associates the portable device with interior elements of the vehicle and permits electronic coupling of content signals and/or control signals between the device and the vehicle media system.

FIG. 1 shows a variety of different locations for temporarily integrating the portable device. In a given vehicle, only one or a few of the locations might actually be configured for integration.

As shown in FIG. 1, the portable device 30 may be integrated in a dashboard 3. Integration into the dashboard reduces the amount of time, and degree of disruption, associated with the driver using the portable device. In this type of integration, controls for the portable media device may be displayed on a screen of a head unit 34. As a result, the driver can view information associated with the portable device 30 on the head unit 34. Likewise, it is easier for the driver to manipulate the controls of the portable device 30 via the head unit.

The portable device 30 may be integrated in a center console 4, e.g., in front of a shifter 9, providing easy access to both the driver and the passenger. For example, the portable device 30 may be integrated in any one or more of the following locations: a glove box 6, a storage bin 7, and/or in any of the doors 8. These locations avoid cluttering other exposed, unobstructed surfaces and spaces in the vehicle while still allowing access to the display and controls of the portable device 30. The portable device 30 may also be integrated into a sun visor 12, which is relatively accessible while somewhat out of the way. For example, the sun visor may be flipped down to view the portable device 30 and flipped up to remove it from view.

Figure 2:
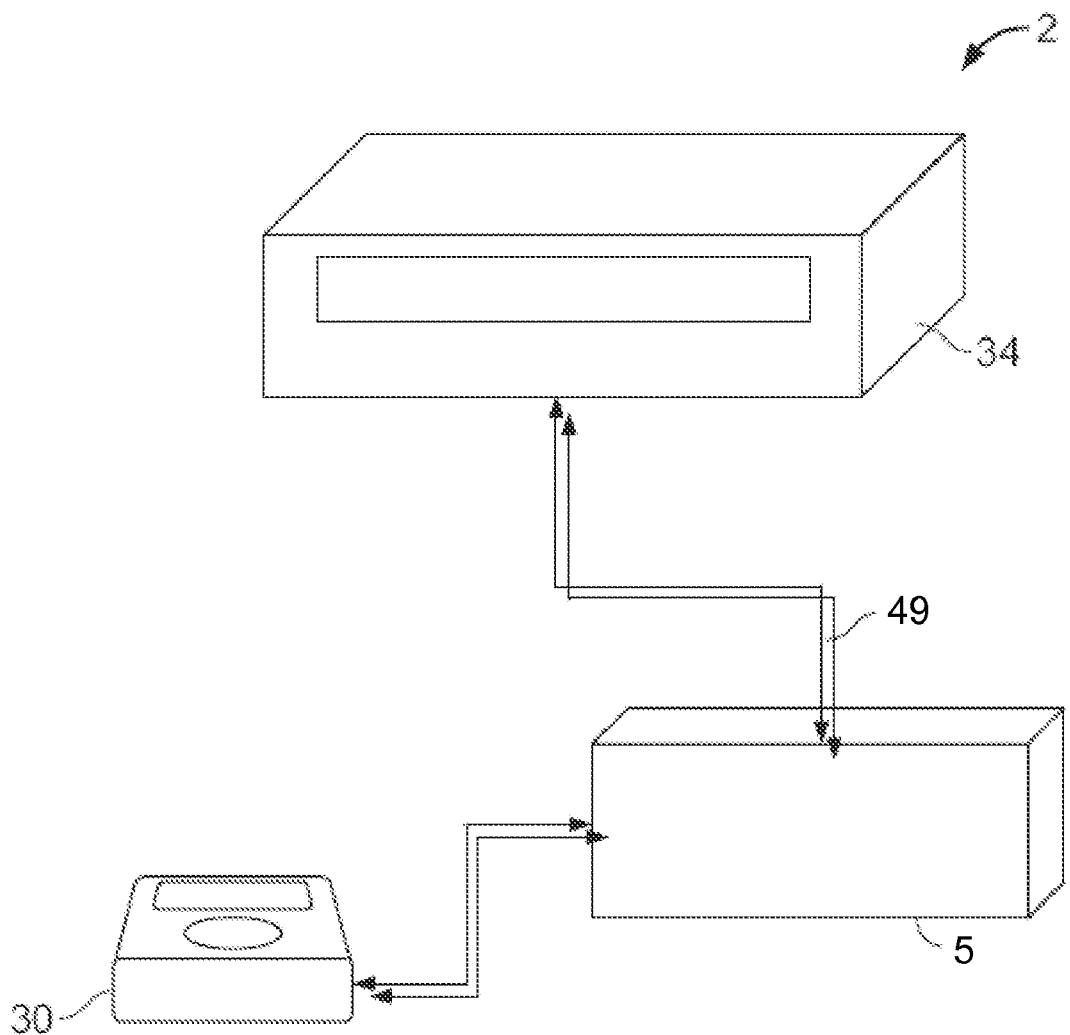
FIG. 2 is a schematic view of a media playing system.

As shown in FIG. 2, a typical way to integrate the portable media player 30 electronically into a vehicle media system 2 is by connecting the portable device 30 to an amplifier 5 that is part of the media system 2. The amplifier 5 may be electrically connected to a head unit 34 by a bus 49. In some examples, the bus 49 is a Media Oriented Systems Transport (MOST) bus. A MOST bus is a multimedia fiber-optic point-to-point network that may be implemented in a ring, star or daisy-chain topology over optical fibers. The MOST bus specifications define a physical (electrical and optical parameters) layer as well as an application layer, a network layer, and media access control address. The MOST bus provides an optical solution for automotive media networks such as video and audio. In some implementations, other buses may be used, such as a controller area network bus (CAN), which is a balanced (differential) 2-wire interface running over either a shielded twisted pair, un-shielded twisted Pair, or ribbon cable.

Figure 3:
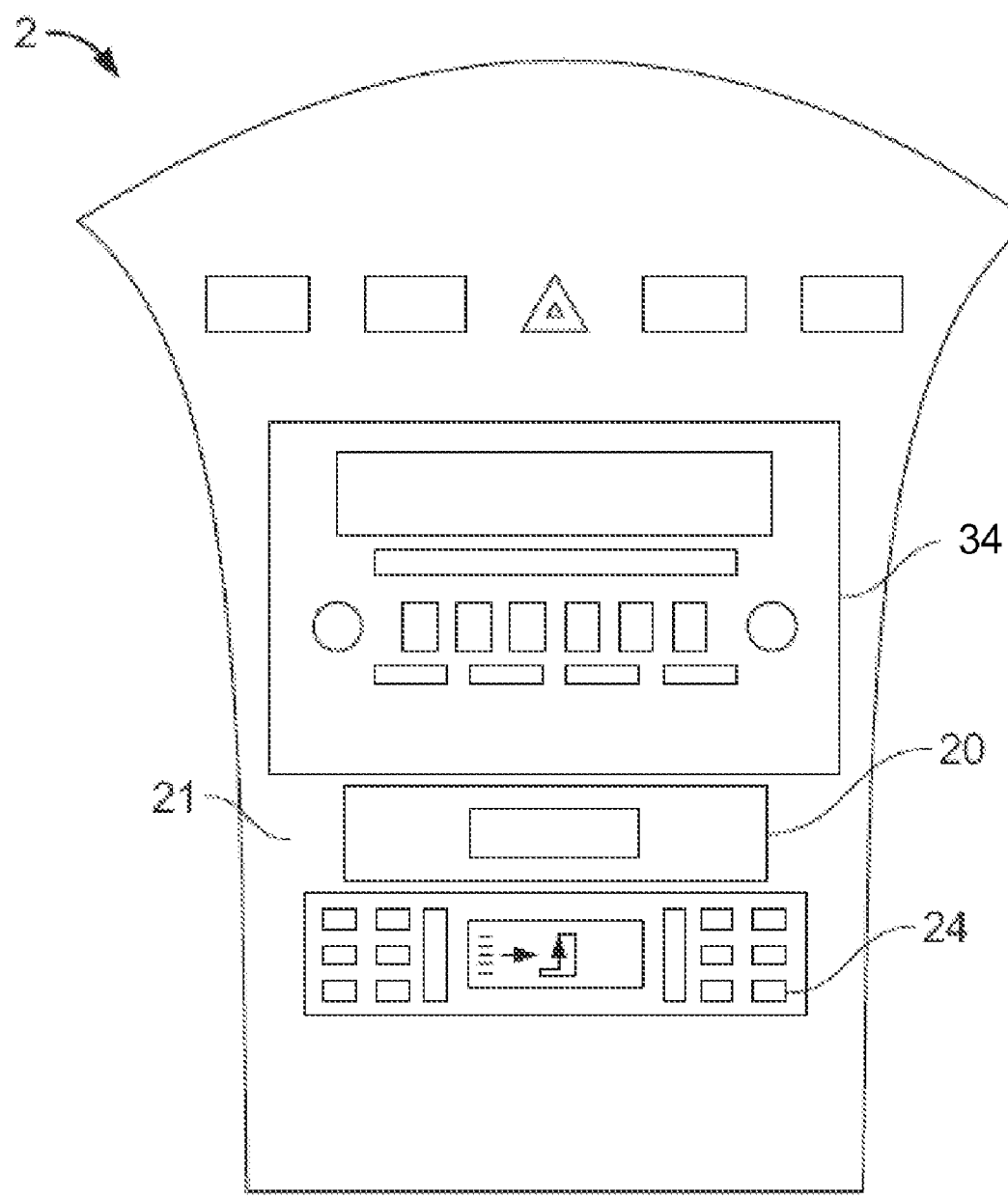
FIG. 3 is a schematic view of a center console of a vehicle.

Referring to FIG. 3, a frame 20 for receiving a portable device 30 is integrated into the vehicle media system 2 by mounting the frame 20 in a slot 21 in the center console 2 and by electronically connecting the frame 20 to the head unit 34. In some implementations, the slot 21 is a slot that complies with DIN standards (Deutsches Institut für Normung e.V. (DIN; in English, the German Institute for Standardization)). DIN slots come in different DIN-sizes such as ½ Din, 1-DIN, 2-DIN AND 2.5-DIN sizes. The basic dimensions of a DIN slot are 7"×2"×10". In some implementations, the frame 20 is below the head unit 34 and above an equalizer 24. In other implementations, the frame 20 may be physically integrated into the head unit 34.

In some examples, some or all of the functional commands available to the user of the portable device 30 through interface controls of the portable device 30 are controlled instead through the head unit 34, and portable device messages that are visible to the user through the interface of the portable device 30 are displayed on a display incorporated into the head unit 34. For example, in a system compatible with the iPod® mobile digital device available from Apple, Inc. in Cupertino, Calif., the commands and messages may include: Customize main menu, Create multiple On-the-Go playlists, Adjust audiobook playback speed, Clicker playback through headphones, Rate songs, Shuffle songs or albums, Repeat one or all, Sound Check on or off, Equalizer settings, Backlight timer, Display contrast, Alarms on, off or silent, Sleep timer, Date and time, Display time in menu bar, Contacts sort and display by first or last names, and Clicker on or off. In some implementations, the head unit 34 incorporates circuitry or software that can encode, send, receive, and decode the commands and messages of the portable device. In some implementations, the commands and messages are displayed at the head unit 34.

In some examples, the hardware and software comply with the PlaysForSure® standard, for example, for purposes of integrating the portable device into the vehicle media system. The PlaysForSure® drivers may be located anywhere in the system including the amplifier 5 and the head unit 34.

Figure 4:
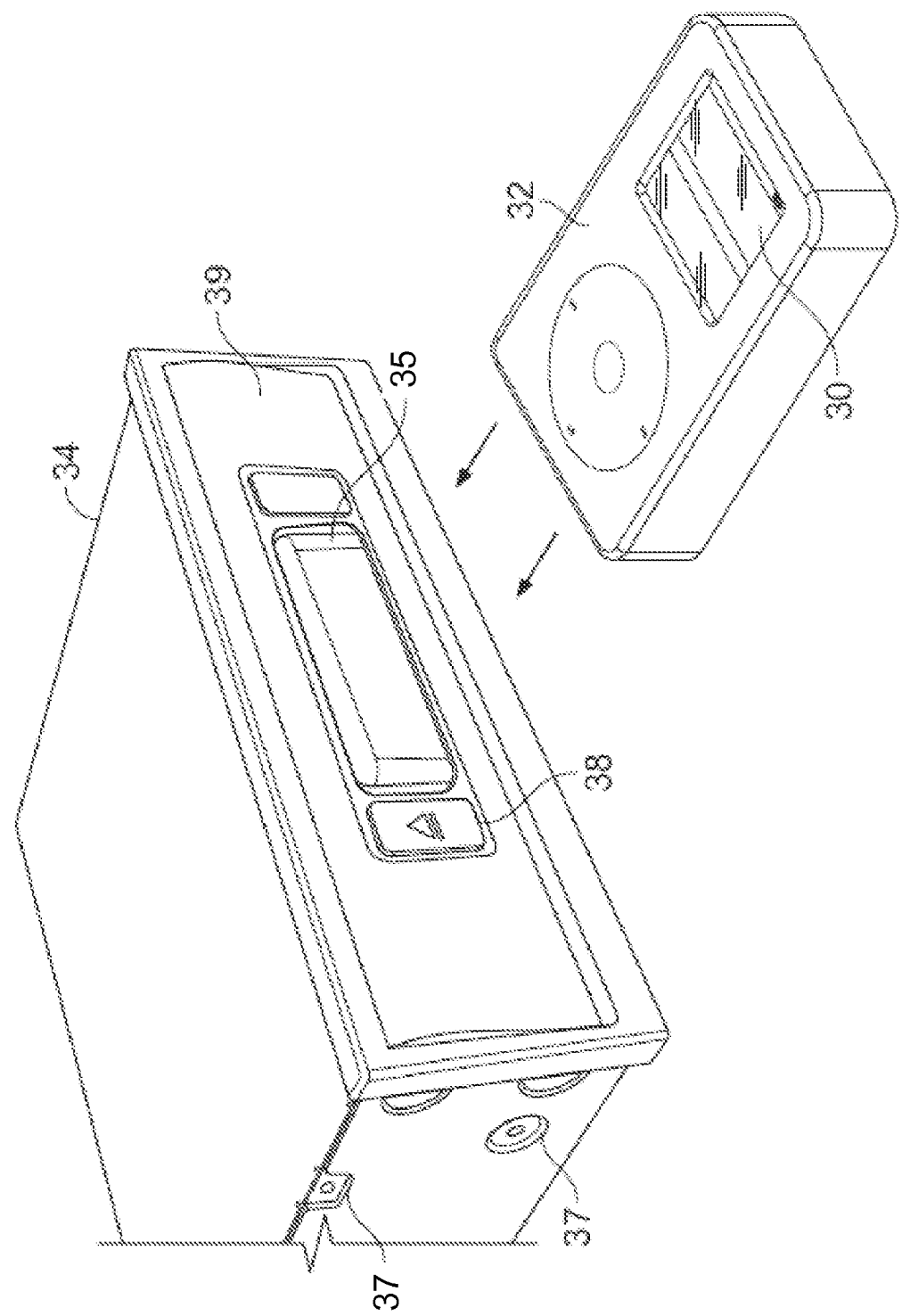
FIGS. 4-5 are perspective views of a media playing system called a gobbler receiving a portable device.
Figure 5:
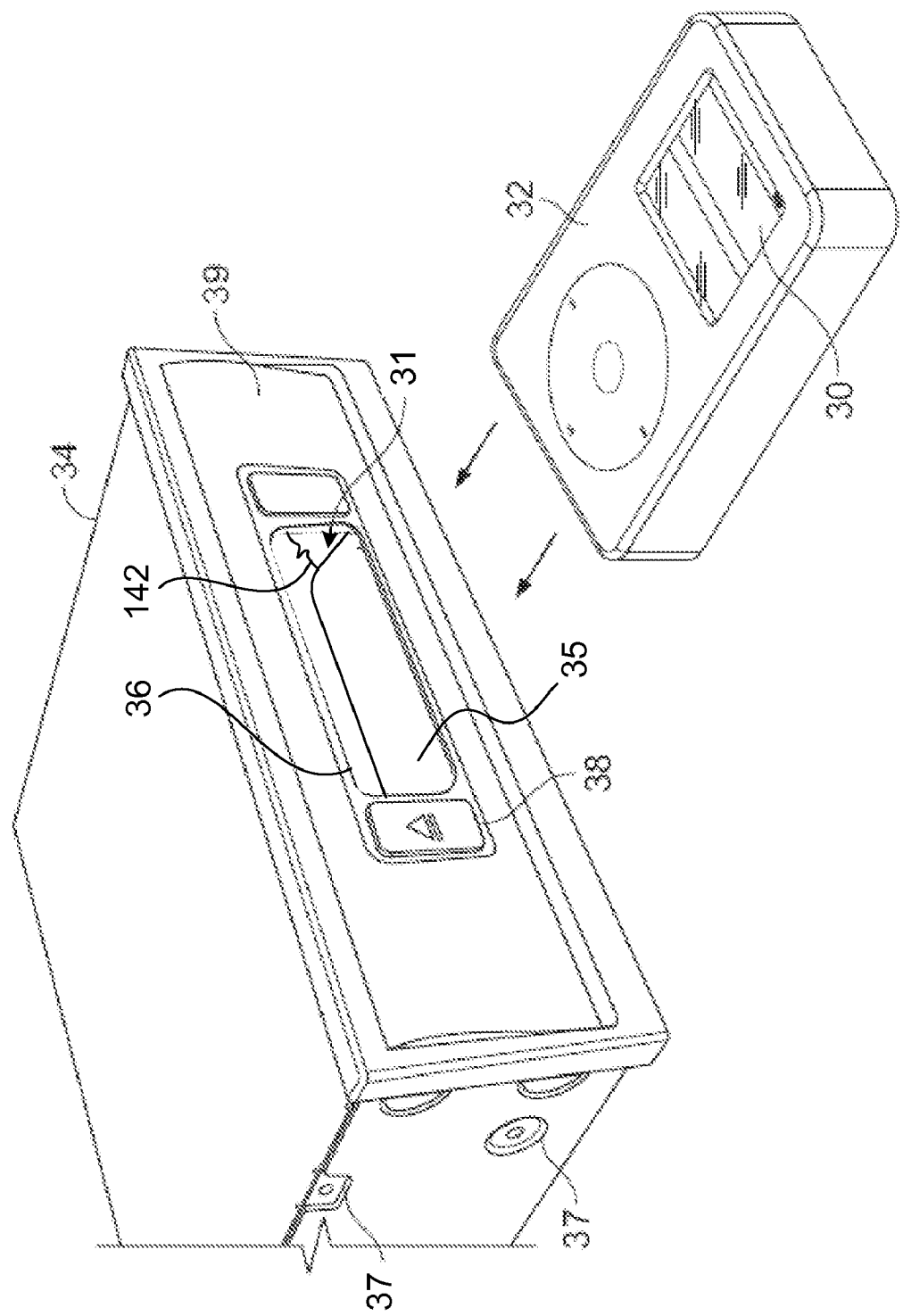

In the examples illustrated in FIGS. 4-5, the frame 20 to integrate the portable device 30 is configured as a so-called gobbler unit 34. The gobbler unit 34 receives the portable device 30 through a defined opening 36 into a chamber 31 having a chamber door 35. When the portable device 30 is received, the gobbler unit 34 connects the portable device 30 electronically to the vehicle media system 2. The chamber door 35 is operable to move between an open position, allowing ingress and egress of the portable device 30 in and out of the chamber 31, and a closed position, closing the defined opening 36. In some examples, the portable device 30 is completely received and housed in the chamber 31 when the chamber door 35 is in the closed position. A guide system 70 (described in further detail below), which may be incorporated in the gobbler unit 34, receives the portable device 30 and places the portable device in communication with the vehicle media system 2. The chamber door 35 prevents premature ejection of the portable device 30 from the chamber 31, which may happen due to malfunction of the gobbler unit 34 or due to a vehicular accident. In the case of a vehicular accident, the door 35 prevents the portable device 30 from becoming a projectile in the vehicle. In some cases, the chamber door 35 is pivotally attached to the face plate 39. In other cases, the chamber door 35 is slidably attached to the face plate 39. The chamber door 35 may be biased by a spring 142 toward the closed position.

The chamber 31 of the gobbler unit 34 may be sized and shaped so that the entire portable device 30 and optionally an associated portable device case 32 (or a significant portion of the device and/or case) will fit within the chamber 31, leaving either no part, only one exposed face, or a larger portion of the device 30 exposed to the user. Depending on the mounting, the user will or will not be able to see displayed information on the portable device 30, and will or will not be able to manipulate controls of the portable device 30.

In some examples, the gobbler unit 34 includes an ejection button 38 operable to cause the ejection of the portable device 30 out of the chamber 31. The gobbler unit 34 includes a face plate 39 and defines screw mounting holes 37 for mounting and mechanically integrating the gobbler unit 34 at one or more of the locations described earlier inside the vehicle. When installed in the vehicle, the face plate 39 may be flush with other interior trim of the vehicle or may project slightly. The size and shape of the gobbler unit 34 may be arranged to fit within a DIN slot. Electrical connectors or cables, not shown, are used to integrate the gobbler unit 34 electronically into the vehicle's media system 2.

In some implementations, the interior chamber 31 of the gobbler unit 34 is adapted to receive only one type of portable device 30, for example, an Apple iPod™ Nano. The chamber 31 may also be adapted to fit only a certain size or configuration of such a portable device 30. Thus, the size and/or shape of the chamber 31 may be exactly matched to that one type and size or configuration of device 30 so that when the portable device 30 is inserted into the defined opening 36 and pushed into place, no additional guides are required to assure correct alignment with the gobbler unit 34. In other examples, chamber 31 is adapted to accept different types of devices 30 having different sizes and/or configurations. The chamber 31 may accept such portable devices 30 via a guide or portable device case 32, into which the portable device 30 is inserted or it may simply adapt itself upon receipt of a portable device 30. That is, the portable device case 32 may be sized to fit chamber 31 and configured to provide an electrical connection between electronics within the chamber 31 and a portable device 30 inside the portable device case 32. In this regard, the exterior of the portable device case 32 may be the same for all sizes, shapes and types of portable devices 30 (so that it may fit within chamber 31), but the interior of the portable device case 32 may be adapted for a specific type, size and/or configuration of portable device 30. In some examples, the portable device case 32 of the portable device 30 may also be covered with a protective coating (and the internal chamber sized accordingly) to protect the finish on the device from the guide mechanisms in the gobbler unit 34 or for other reasons such as aesthetics or branding.

Figure 8:
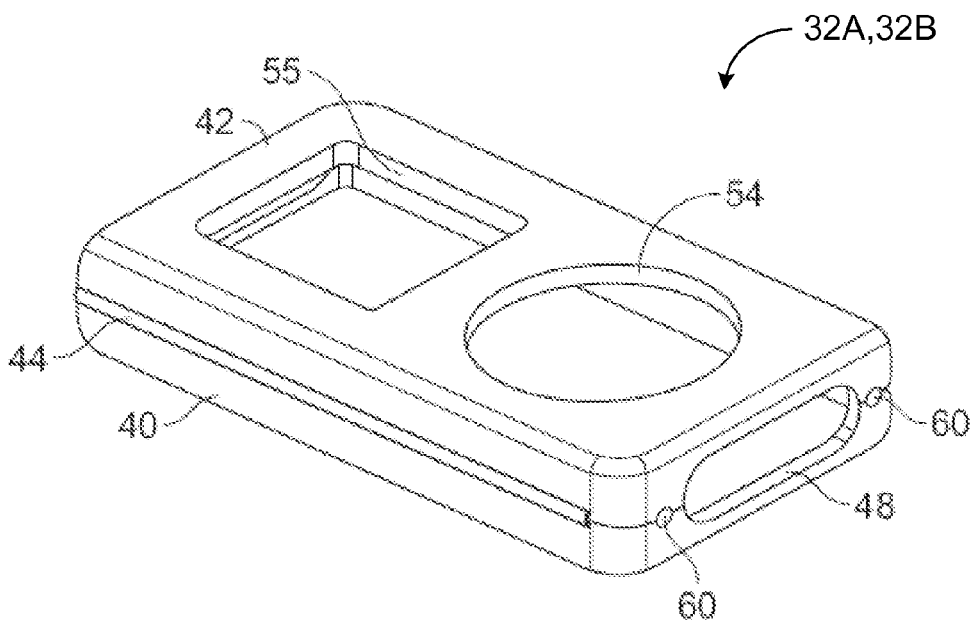
FIGS. 8-9 are perspective views of portable media player holders.

In the examples illustrated in FIGS. 6-8, each portable device case 32A, 32B includes a base 40, a face cover 42, a hinge 44 and a locking mechanism 50. The base 40 and face cover 42 are configured to accept different sized portable devices 30. In some implementations, the interior dimensions of the base 40 and face cover 42 match the dimensions of the portable device 30. In other implementations, the portable device case 32A, 32B is a sleeve and the portable device 30 slides snugly into one end of the sleeve.

The portable device case 32A, 32B defines an opening 48 that exposes an electronic connector 52 of the portable device 30 for connection to a connector (see, e.g. FIG. 27) in the gobbler unit 34. When the portable device 30 is inserted into the gobbler unit 34, the connector 52 mates with a gobbler unit connector (not shown) to establish communication with the vehicle media system 2 and thereby enable one or more of media signals, commands, and power, to be transmitted between the vehicle media system 2 and the portable device 30.

The face plate 42 defines two openings 54, 55 that expose the controls 56 and display 58 of the portable device 30 (in this case an iPod® mobile digital device) to the user. The number and placement of the openings 54, 55 are selected in accordance with a model of the portable device 30 that the portable device case 32A, 32B is configured to house, such that the controls 56 and displays 58 of the selected portable device 30 are accessible.

In some implementations, the hinge 44 is molded integral with the base 40 and the face cover 42. In other implementations, the hinge 44 is constructed using a standard hinge pin configuration. In either case, the base 40 and the face cover 42 are rotatably joined to each other. The hinge 44 may act as a key to assist in correctly aligning the portable device case 32A, 32B with the gobbler unit 34. For this purpose, the front opening 36 of the gobbler unit 34 may define a notch on only one side of the defined opening 36 that accepts the hinge 44 as a keyed element, while not accepting the hinge 44 as a keyed element on the opposite side.

In addition to the hinge 44, the portable device case 32A, 32B may also contain receiving features 60 (two holes on either side of the connector end in the example shown) to aid alignment of the portable device 30 with a connector (not shown) in the gobbler unit 34. The receiving features 60 align with corresponding guide pins (not shown) mounted inside the chamber 31 of the gobbler unit 34 so that when the portable device 30 and portable device case 32 are inserted into the chamber 31, the pins mate with the holes to guide the portable device case 32A, 32B and its associated electronic connector 52 to be received by the connector 113 of the gobbler unit 34.

In some implementations, the portable device case 32B may be used to allow for a smaller portable device 30 to be received by the gobbler unit 34. For example, referring to FIG. 7, the portable device case 32B may include ribs 46 to hold the portable device 30 in the required orientation to mate with the gobbler unit 34. The location and size of the ribs 46 are selected for a particular smaller portable device 30 to be used in the gobbler unit 34. This allows for a one-size gobbler unit 34 to be placed in the vehicle and for many device-specific portable device cases 32 having the standard external dimensions for a variety of portable devices 30 to be manufactured. A given portable device case 32 may also have interior elements like the ribs 46 that are adjustable or removable so that a single standard sized portable device case 32 could accommodate more than one different type of portable device 30.

In some implementations, the opening 36 and chamber 31 of the gobbler unit 34 are constructed to receive a standard size structure. A standard-sized portable device case 32, such as the one shown in FIG. 8, may be used to compensate for the different dimensions of different actual portable devices 30. In these implementations, a device specific case 32 has standard exterior dimensions and has interior dimensions or elements that are adapted to fit a specific portable device 30. The portable device case 32 is thus usable to hold and align the portable device 30 within the gobbler unit 34 regardless of the size of the portable device 30.

Figure 9:
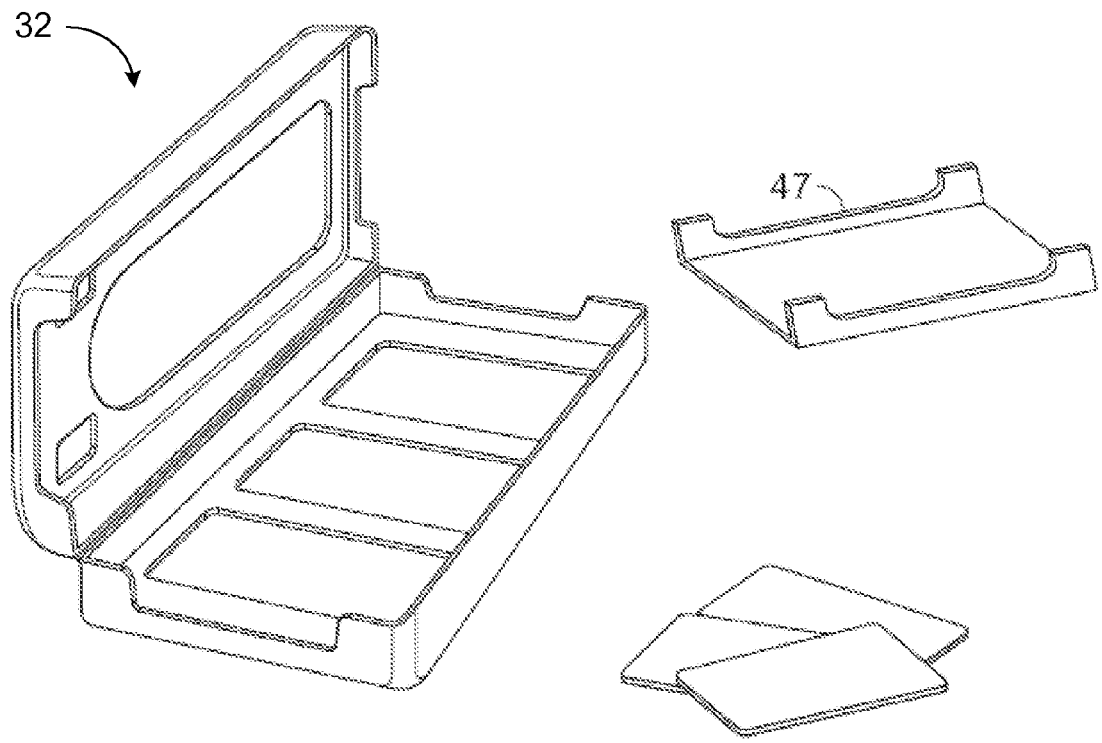

As shown in FIG. 9, the portable device case 32 having standard external dimensions may be designed to receive an insert 47 designed to hold a specific portable device.

Figure 10:
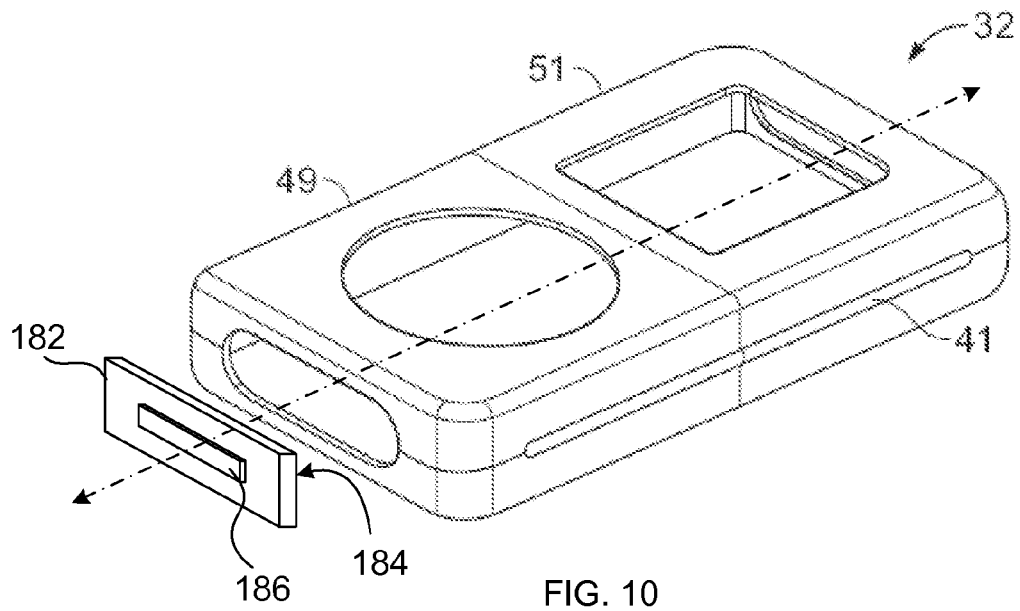
FIG. 10 is a perspective view of a portable media player holder with a converter circuit.

In FIG. 10, the portable device case 32 has a lower portion 49, which fits snugly over a portable device (not shown). In some examples, the lower portion 49 is removably attached to an upper portion 51. In some implementations, the portable device case 32 includes a rail 41 that acts as a key to assist alignment of the portable device case 32 with the gobbler unit 34, as described above with regard to the hinge 44.

In some implementations, the portable device case 32 includes a converter circuit 182 in electrical connection with a first coupler 184 that is configured to receive the device connector 52 (FIG. 6) of the portable device 30. A second coupler 186 in electrical connection with the converter circuit 182 is configured to be received by a connector 72 (see e.g., FIG. 13) in the gobbler unit 34. The converter circuit 182 (described in more detail below) converts electrical signals and/or communications from the portable device 30 to a format or type that is recognized by, and compatible with, the gobbler unit 34. Similarly, the converter circuit 182 converts electrical signals and/or communications from the gobbler unit 34 to a format or type that is recognized by, and compatible with, the portable device 30.

Figure 11:
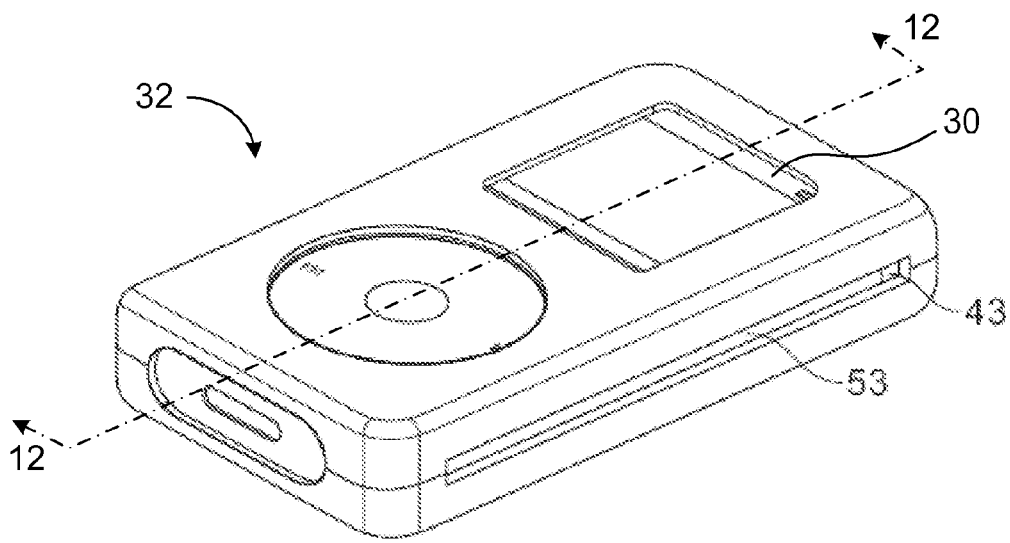
FIG. 11 is a perspective view of a portable media player holder.
Figure 12:
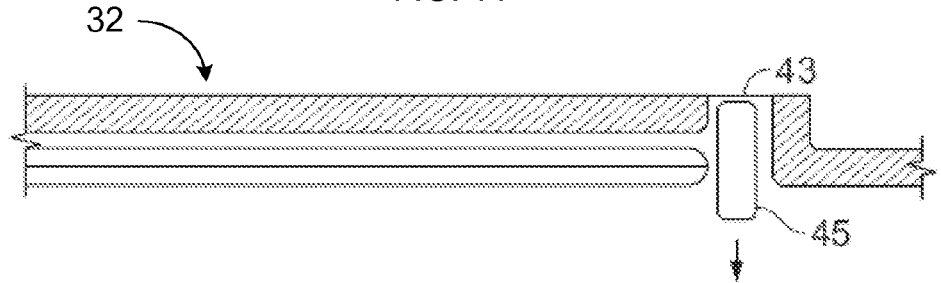
FIG. 12 is a partial sectional side view of a portable media player holder.

In the example illustrated in FIG. 11, the portable device case 32 defines a slot 53 in its side for accepting a corresponding rail provided by the gobbler unit 34. The slot/rail combination assists in achieving correct alignment of the portable device case 32 within the gobbler unit 34. In some implementations, as shown in FIG. 12, an opening or recess 43 is defined in the portable device case 32 to receive a pin 45 that holds the portable device 30 in place within the gobbler unit 34. When the portable device 30 is ejected from the gobbler unit 34, the pin 45 is removed from the opening or recess 43, thereby releasing the portable device case 32 and allowing ejection thereof.

Figure 13:
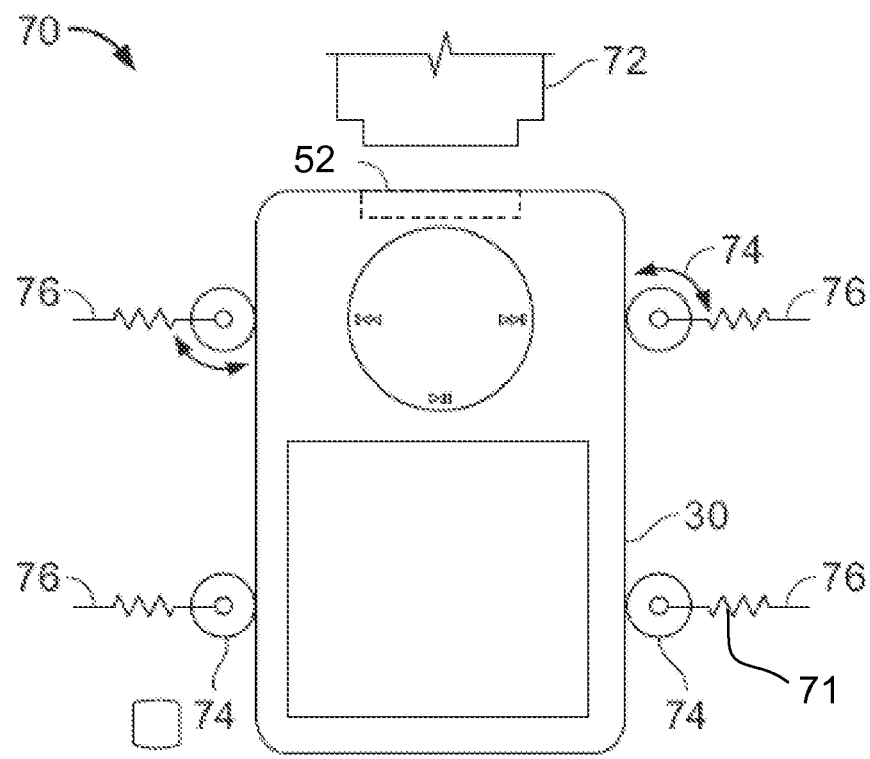
FIG. 13 is a top view of a guide system with a received portable device.

FIG. 13 illustrates a guide system 70 that may be incorporated into the gobbler unit 34. The guide system 70 includes guides 74 used to align the portable device connector 52 with an electrical connector 72 of the gobbler unit 34. In some implementations, the guides 74 engage the sides of the portable device 30. The guides 74 may include a slide, a tray, rollers, or wheels, for example. In some implementations, a biasing system 76, such as a set of springs, is connected to the guides 74 to keep the portable device 30 correctly aligned and firmly held in place within the gobbler unit 34. In implementations that incorporate a slide, the portable device 30 slides between two slides to connect with the gobbler unit connector 72. In the roller or wheel implementations, the portable device 30 moves along a path into the gobbler unit while the guides roll along the surface of the portable device 30 to guide the portable device into the gobbler unit.

In some implementations, the biasing system 76 is adjustable to permit portable devices 30 of different sizes to be used with the gobbler unit 34. For example, the biasing system 76 may expand or contract to accept the portable device 30 and maintain alignment with the gobbler unit connector 72. Springs 71 may be used to enable the expansion or contraction.

Figure 14:
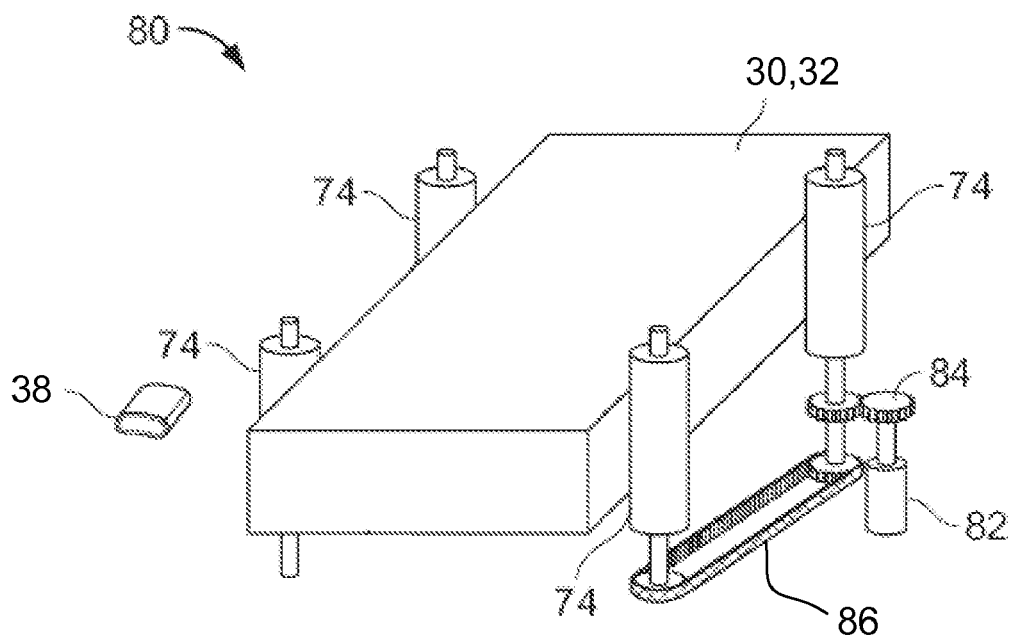
FIGS. 14-15 are perspective views of guide systems with received portable devices.
Figure 15:
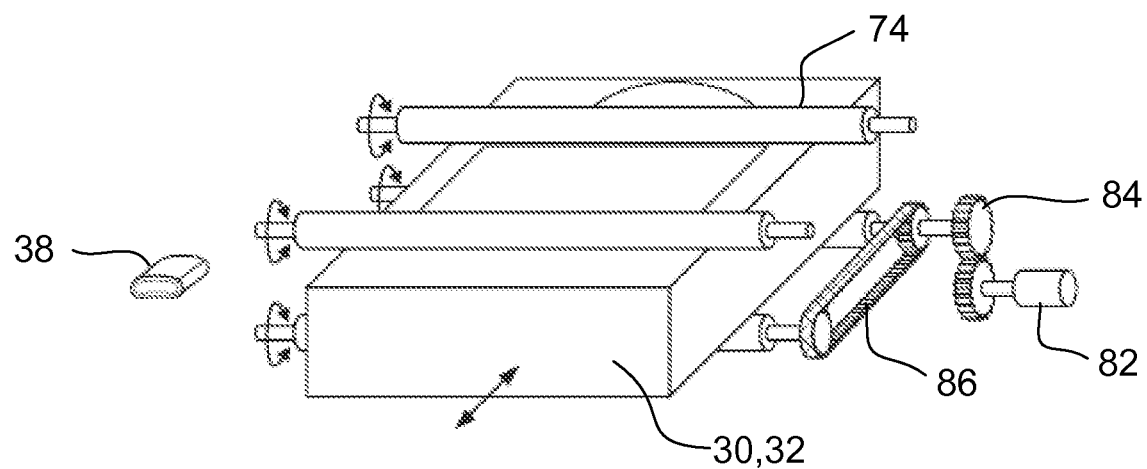

In the example illustrated in FIG. 14, a motorized guide system 80 is located within the gobbler unit 34 and is operable to insert and eject the portable device 30, optionally carried by the portable device case 32, from the gobbler unit 34. In some motorized implementations, a motor 82 drives a gear 84 and belt 86 mechanism to rotate two guides 74, which brings the portable device 30 into contact with the gobbler unit connector 72. In other implementations, the motor 82 is coupled directly to a first guide 74 and to a second guide 74 by the belt 86. The motor 82 may be activated by insertion of the portable device 30 into the gobbler unit 34. Once activated, the motor 82 transports the portable device 30 until it is connected with the gobbler unit connector 72. In response to a signal from the ejection button 38, the portable device 30 is disengaged from the gobbler connector 72 by reversing the motor 82. In some implementations, such as that shown in FIG. 15, the motorized guide system 80 engages the front and back of the portable device 30.

Figure 16:
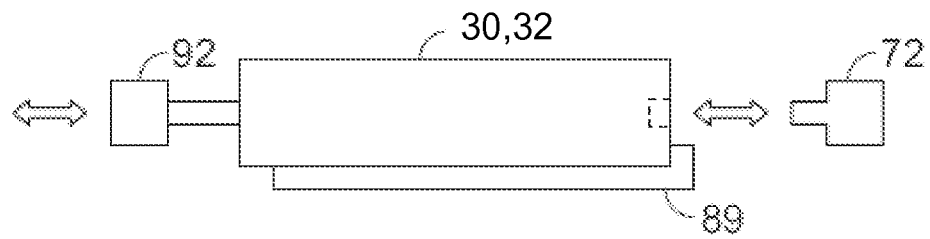
FIG. 16 is a side view of an ejection system and a support tray holding a portable device.
Figure 17:
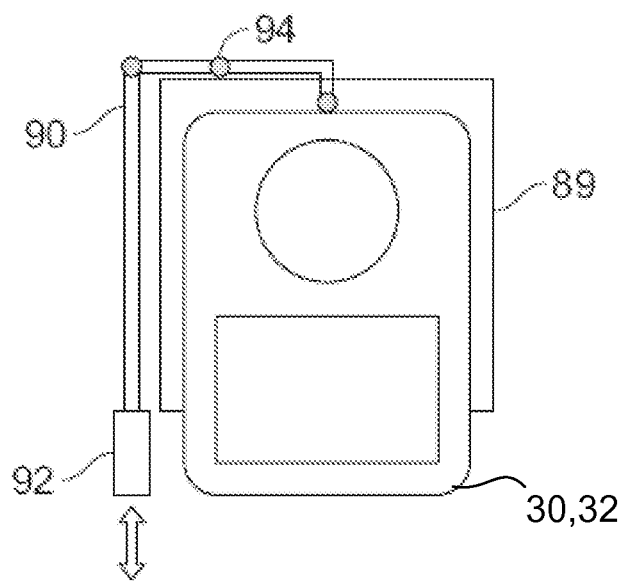
FIG. 17 is a top view of a support tray holding a portable device.

In FIGS. 16-17, a support tray 89 is used to guide the portable device 30, optionally carried by the portable device case 32, to the gobbler unit and align the device connector 52 with the gobbler unit connector 72. In some examples, an eject mechanism 90 is coupled to the support tray 89. Responsive to a force on an eject button 92, the eject mechanism 90 pivots about a pivot point 94 and forces the support tray 89 to disengage from the connector 72. The eject mechanism 90 may be in communication with or coupled to the chamber door 35 (see, e.g. FIG. 5), which prevents premature ejection of the portable device 30 from the chamber 31. Premature ejection may be attempted due to a malfunction of the gobbler unit 34 or due to a vehicular accident. In the case of a vehicular accident, the chamber door 35 prevents the portable device 30 from becoming a projectile in the vehicle.

In either a motorized or non-motorized configuration, a push/lock feature may be incorporated into the gobbler unit 34. The push/lock feature locks the portable media device 30 into the gobbler unit 34 once it has been pushed to a certain point. Like the chamber door 35, the push/lock feature prevents premature ejection of the portable device 30 from the gobbler unit 34. This feature also helps prevent the portable device 30 from becoming a projectile during a vehicular accident.

Figure 18:
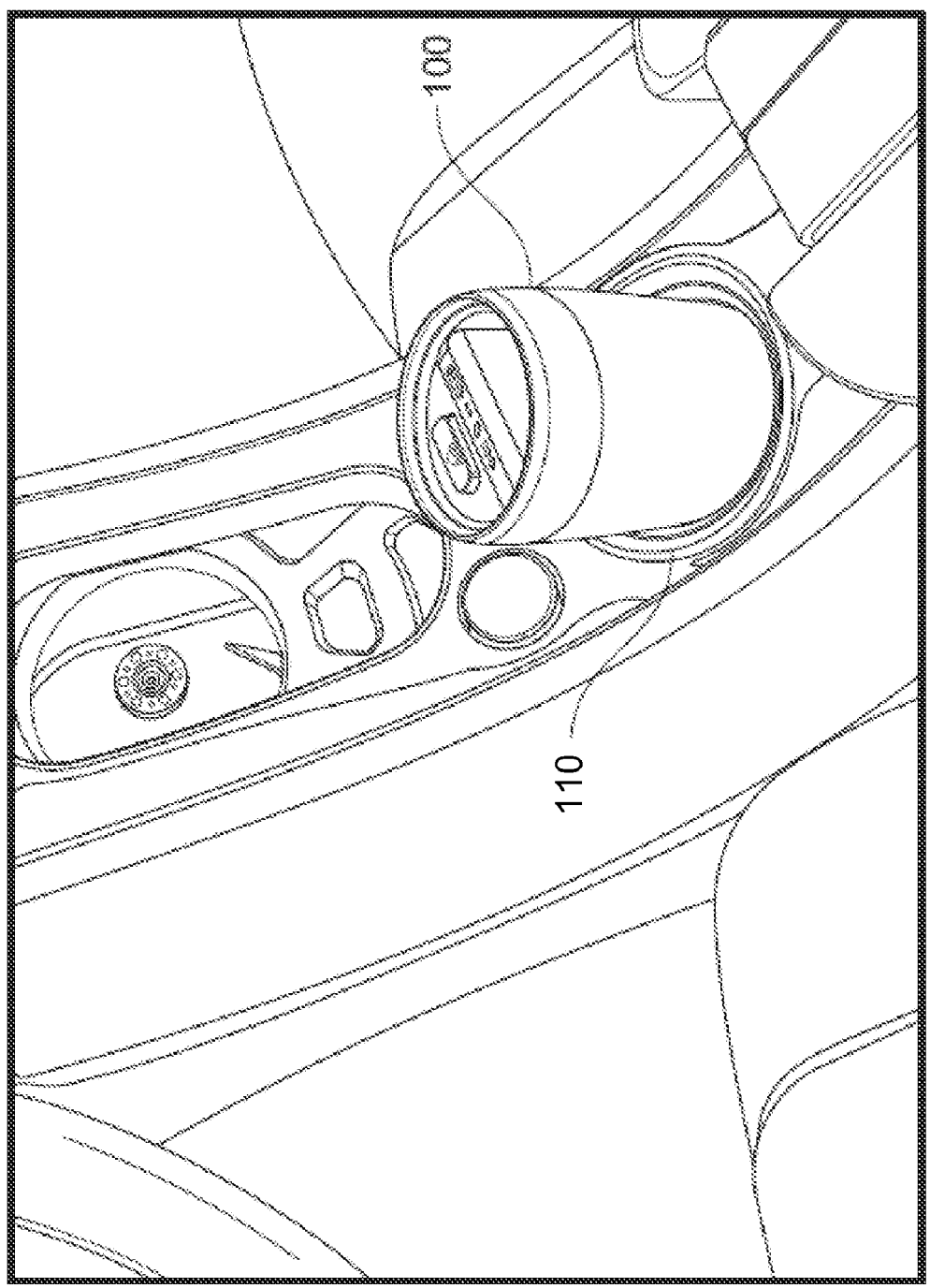
FIG. 18 is a perspective view of a vehicle center console receiving a portable media player holder.

Other types of frames and cases for portable devices 30 may be used in association with the vehicle media system 2. For example, in FIG. 18, which depicts a portable device interfacing system 1000, a can-type holder 100 is used. The can-type holder 100 may be configured to receive the portable device 30 and/or the portable device case 32. The can-type holder 100 includes connectors (see, e.g., FIG. 20) to enable communication between the vehicle media system 2 and the portable media device 30 within the can-type holder 100 when the can-type holder 100 is mated to a receiving unit receptacle 110. The receiving unit receptacle 110, in one example, may be cup holder, which is adapted to receive the can-type holder 100. In some implementations, the can-type holder 100 is adapted to fit within a standard vehicle cup holder receptacle, which is defined by the receiving unit receptacle 110 and which is adapted to allow the portable device 30 to communicate electronically with the vehicle media system 2. In some implementations, the can-type holder 100 is cup-shaped.

Figure 19:
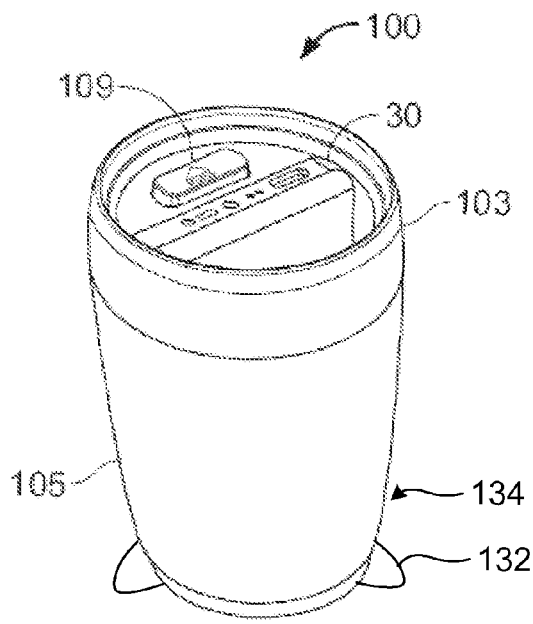
FIG. 19 is a perspective view of a portable media player holder with alignment features.

In FIG. 19, the can-type holder 100 includes one or more guide features 132 disposed on a holder body 105. The guide features 132 are part of an alignment system 130, described in detail with reference to FIG. 27, to provide a particular orientation of the can-type holder 100 as it is received by the receiving unit receptacle 110. In the example shown, the guide features 132 are protrusions (e.g., ribs) on a lower portion 134 of the holder body 105 of the can-type holder 100.

Figure 20:
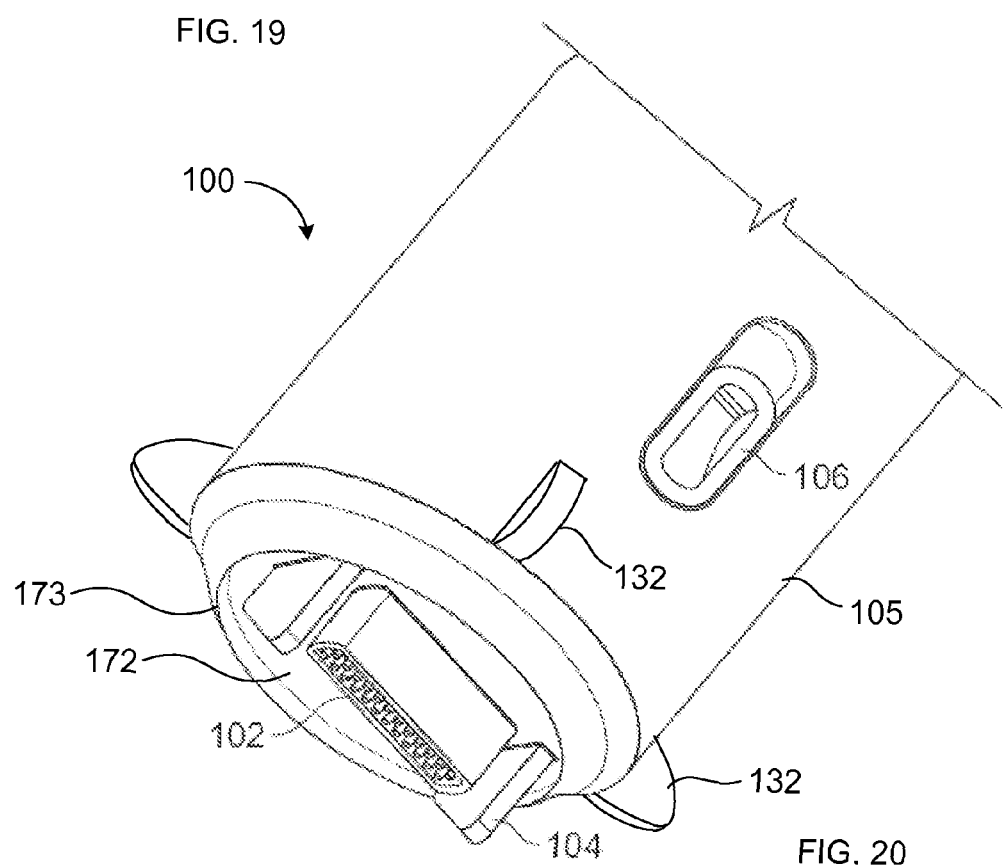
FIG. 20 is a bottom perspective view of a portable media player holder with alignment tabs.

In FIG. 20, a slider 106 may be used to deploy and retract the holder connector 102 to/from the bottom 172 of the holder body 105. The holder connector 102 is shown in a deployed position. In the retracted position, holder connector 102 is within the bottom lip 173 of holder body 105. In some implementations, tabs 104 are also deployed and retracted by the slider 106. The tabs 104 can be used to protect the holder connector 102 from being improperly inserted into the receiving unit receptacle 110 as well as to open a door (exposing a mating connector) in the receiving unit receptacle 110 for receiving the can-type holder 100. The retractability of the holder connector 102 allows the can-type holder 100 to sit on a flat surface when not being used to connect to the media system 2. In some implementations, the tabs 104 are used as guides to correctly align the holder connector 102 with a corresponding connector 113 in the receiving unit receptacle 110, as the can-type holder 100 is inserted for connection with the vehicle media system 2. In some examples, the tabs 104 are angled so that the can-type holder 100 may be inserted into the receiving unit receptacle 110 in only one orientation.

Figure 21:
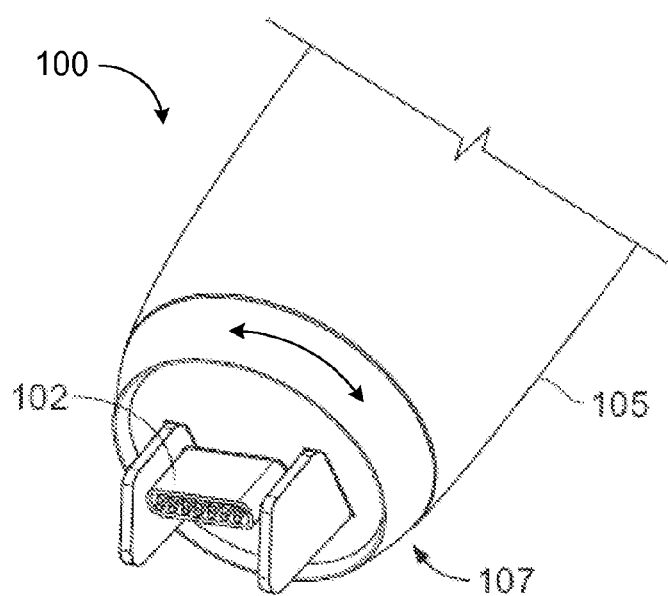
FIG. 21 is a bottom perspective view of a portable media player holder with alignment tab and a connector.

In FIG. 21, the holder connector 102 is deployed by rotating a base ring 107 or lid 103 in relationship to the holder body 105, exposing the holder connector 102 for mating to a corresponding connector in the vehicle media system 2. In some implementations, the holder connector 102 is deployed using a platform inside of the can-type holder 100 and connected to a circular track molded inside of the holder body 105. As the base ring 107 is turned the platform rides down the track until the connector 102 is deployed. When the base ring 107 is turned in the opposite direction the connector 102 is retracted.

Figure 22:
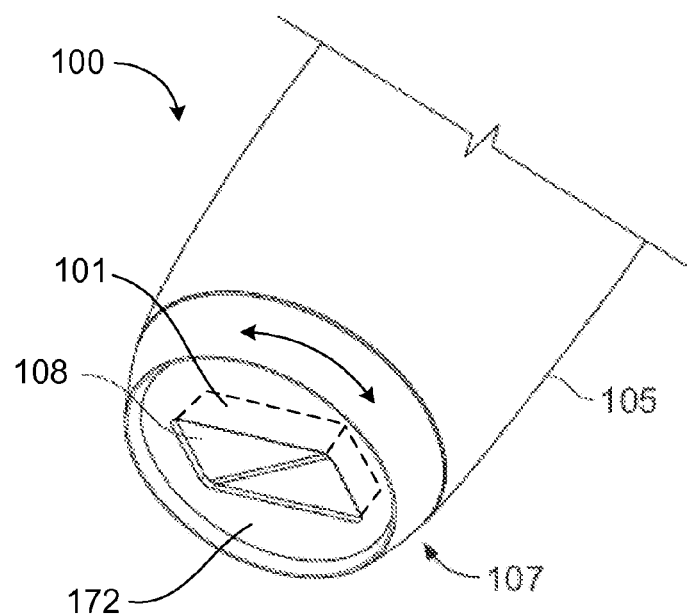
FIG. 22 is a bottom perspective view of a portable media player holder with a bottom door covering a connector.

In some implementations, as shown in FIG. 22, doors 108 disposed on the bottom 172 of the holder body 105 are also retracted by rotation of the base ring 107 or lid 103. The doors 108 cover a coupler cavity 101 defined in the bottom surface 172 of the holder body 105. The coupler cavity 101 houses the holder connector 102. In some examples, the doors 108 are configured to deploy into a position that is substantially perpendicular to the bottom 172 of the can-type holder 100 and act as guides to correctly align the holder connector 102 with a corresponding connector in the receiving unit receptacle 110 of the vehicle media system 2. Pins may be exposed to act as guides, as well. In other examples, the doors 108 slide open to expose the holder connector 102. The doors 108 may be constructed with gears which communicate with teeth on the inside of the base ring 107 and the doors 108 slide open in response to the rotation of the ring 107.

Figure 23:
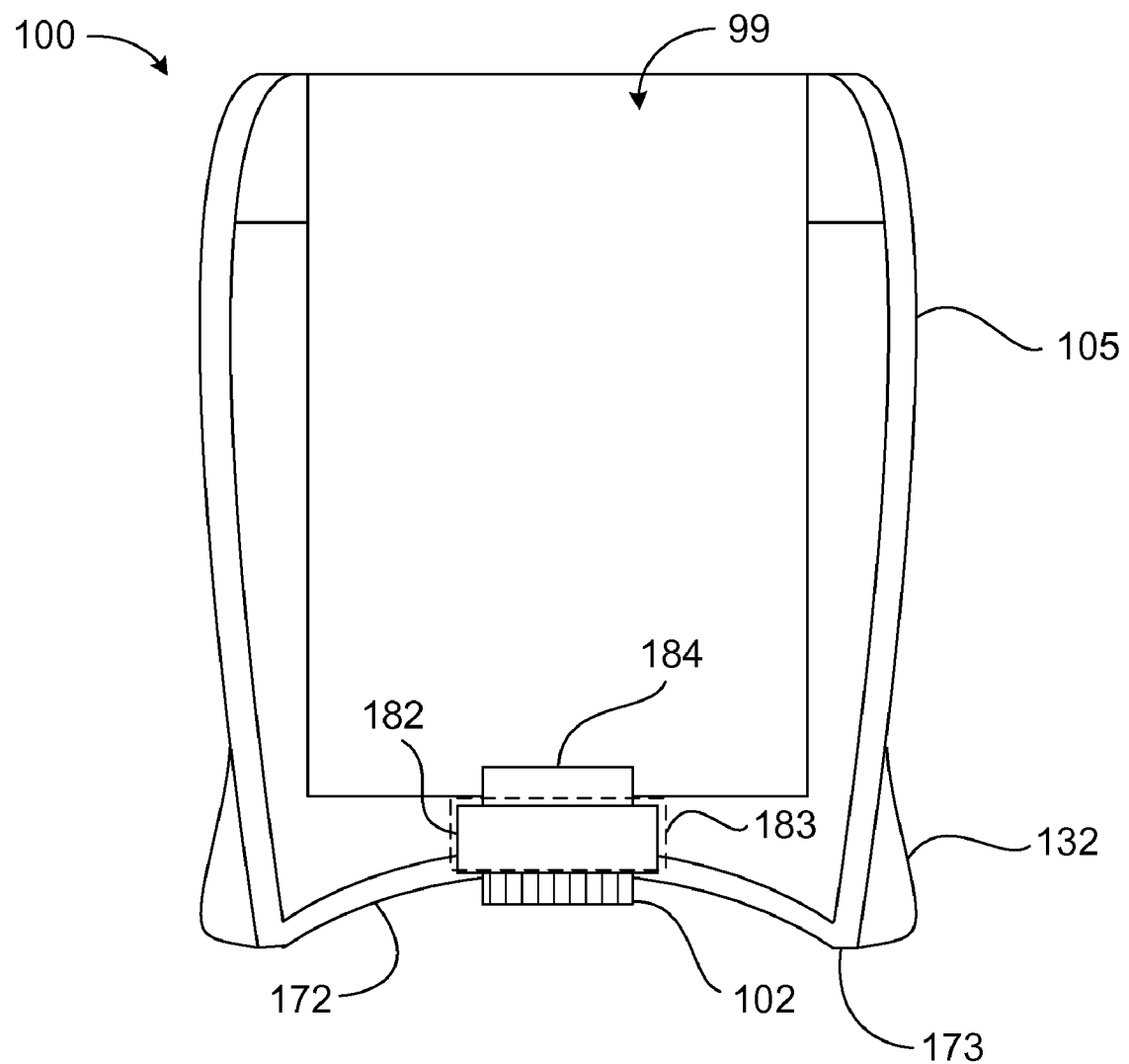
FIG. 23 is a sectional view of a portable media player holder with alignment features and an integrated converter circuit.

In the example illustrated in FIG. 23, the can-type holder 100 defines a concave bottom surface 172 to which is mounted the holder connector 102. Placement of the holder connector 102 on the concave bottom surface 172 spaces the holder connector 102 from the bottom edge 173 of the holder body 105, thereby protecting the holder connector 102 when the can-type holder 100 is placed on a flat surface. The example shown also includes guide features 132 disposed on the holder body 105.

Figure 24:
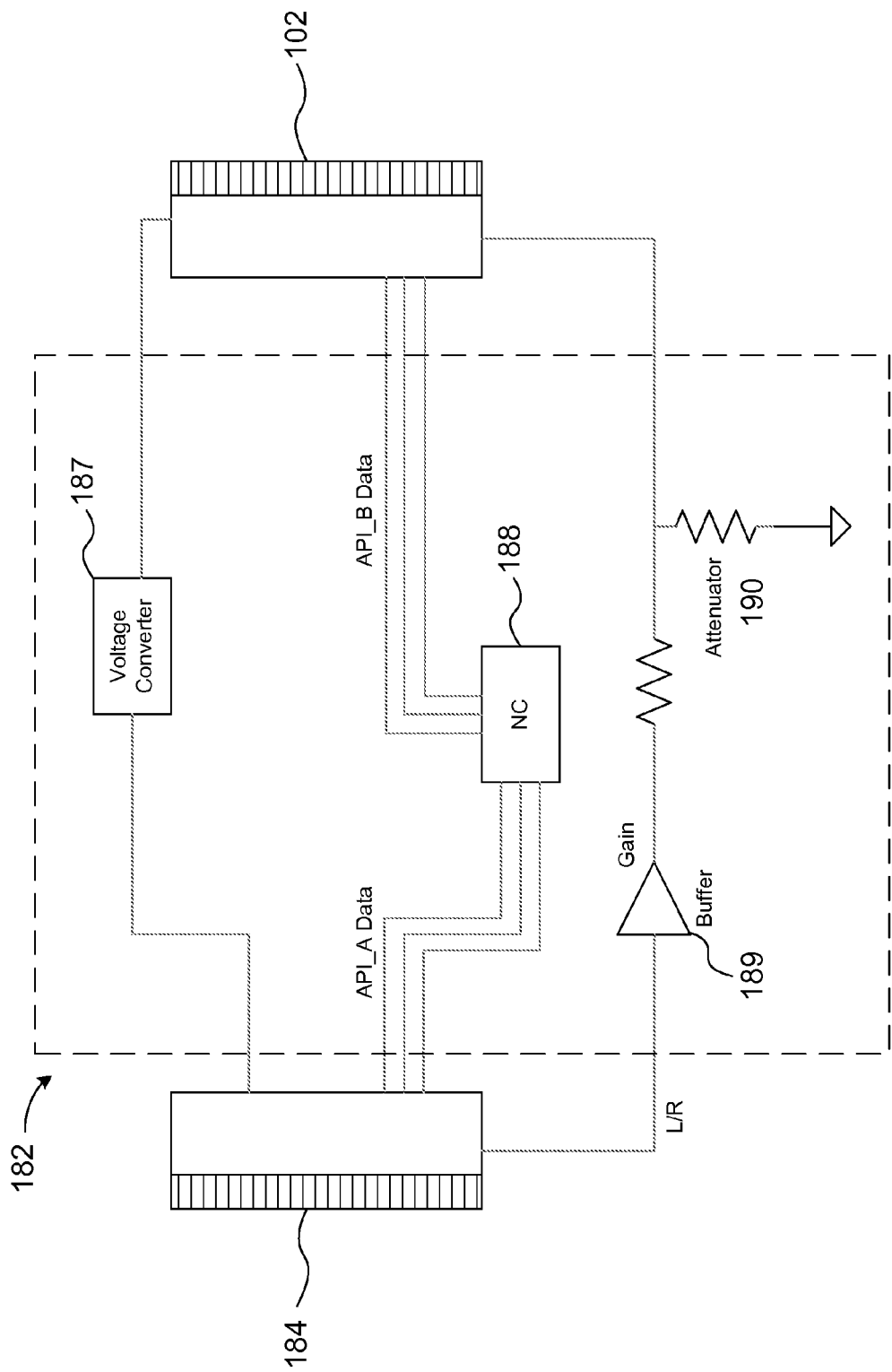
FIG. 24 is a schematic view of a converter circuit.

Referring to FIGS. 23-24, in some implementations, the can-type holder 100 includes a converter circuit 182 housed in an electronics chamber 183 (e.g., in a bottom portion of the holder 100) and in electrical connection with a device coupler 184 configured to receive the device connector 52 of the portable device 30. The holder connector 102 is in electrical connection with the converter circuit 182. The converter circuit 182 converts electrical signals or communications from the portable device 30 received by the can-type holder 100 to a format or type that is recognized by and compatible with the vehicle media system 2. Similarly, the converter circuit 182 may also convert electrical signals or communications from the vehicle media system 2 to a format or type that is recognized by and compatible with the portable device 30.

The converter circuit 182 converts power, control data/signals, and audio in/out signals to device specific levels or formats. In one example, the converter circuit 182 includes a voltage converter 187 to step up/down a voltage communicated between the connectors 102, 184 (e.g., 12 V to 5 V), an integrated circuit 188 converting control signals to specific formats between the connectors 102, 184, a buffer 189 that is capable of amplification, and/or an attenuator 190.

Figure 25:
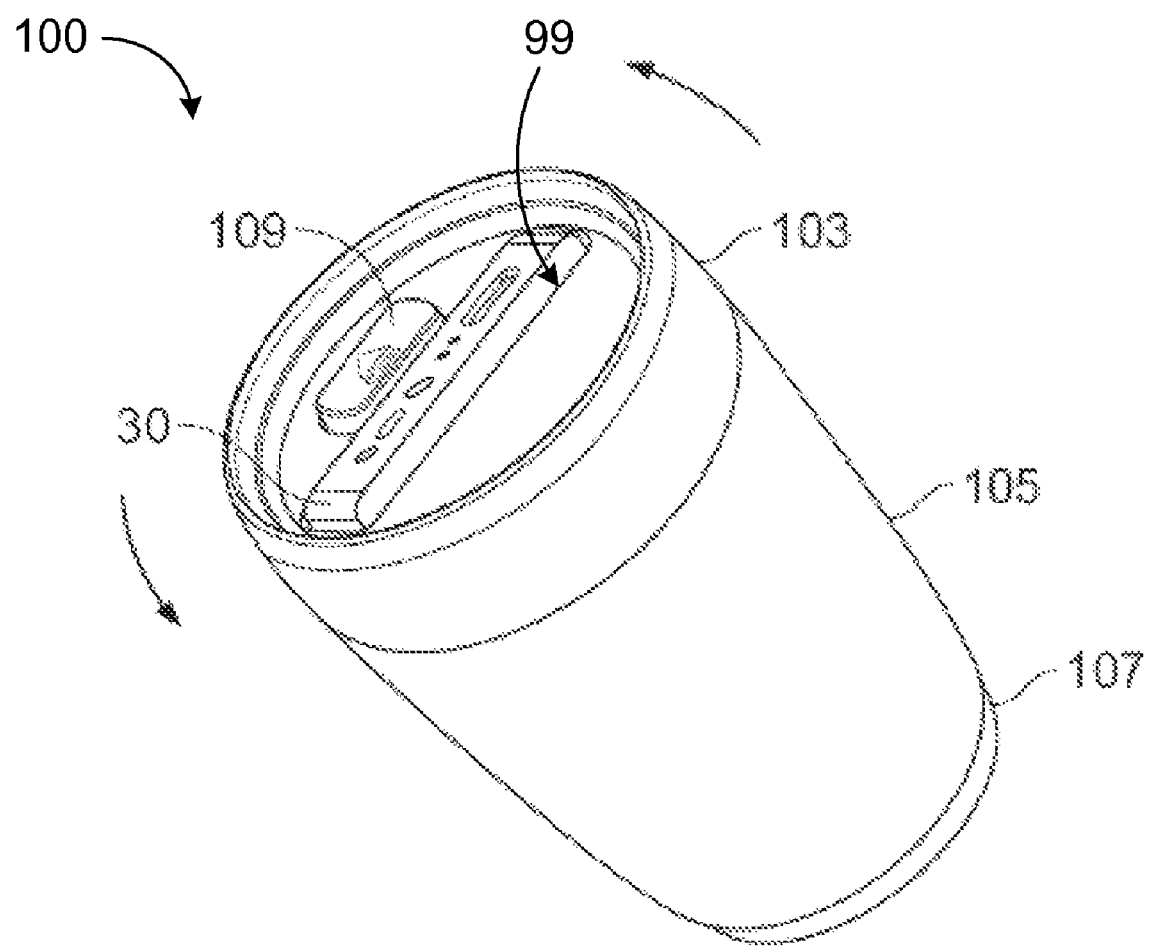
FIG. 25 is a perspective view of a portable media player holder with a twistable lid portion.

As shown in FIG. 25, the portable device 30 may be secured in the can-type holder 100 by rotating a lid 103 in relationship to the holder body 105. In some implementations, rotation of the lid 103 deploys pins within the holder body 105 that mate with reciprocal guide receivers (not shown) to secure the portable device 30 and prevent the portable device 30 from falling out of the can-type holder 100. In other implementations, rotation of the lid 103 moves rubber arms within the can-type holder 100 which engage the portable device 30 to prevent it from falling out of the can-type holder 100. In some cases, the portable device 30 is inserted into the can-type holder 100 and pushed against a spring mechanism located proximate to the bottom of the holder body 105 and provides a force opposed to the insertion until the portable device 30 is fully within the can-type holder 100. The portable device 30 locks in place by being pushed by a second spring mechanism away from a rectangular opening 99 (FIG. 23) so that the portable device 30 is no longer aligned with the opening 99.

In some examples, an eject mechanism 109 is incorporated to disengage the portable device 30 from the can-type holder 100. The portable device 30 is ejected when the eject button 109 is depressed and the portable device 30 is pushed back into alignment with the opening. In other implementations, the portable device 30 may be released by rotating the lid 103 in relationship to the holder body 105 in the opposite direction.

Figure 26:
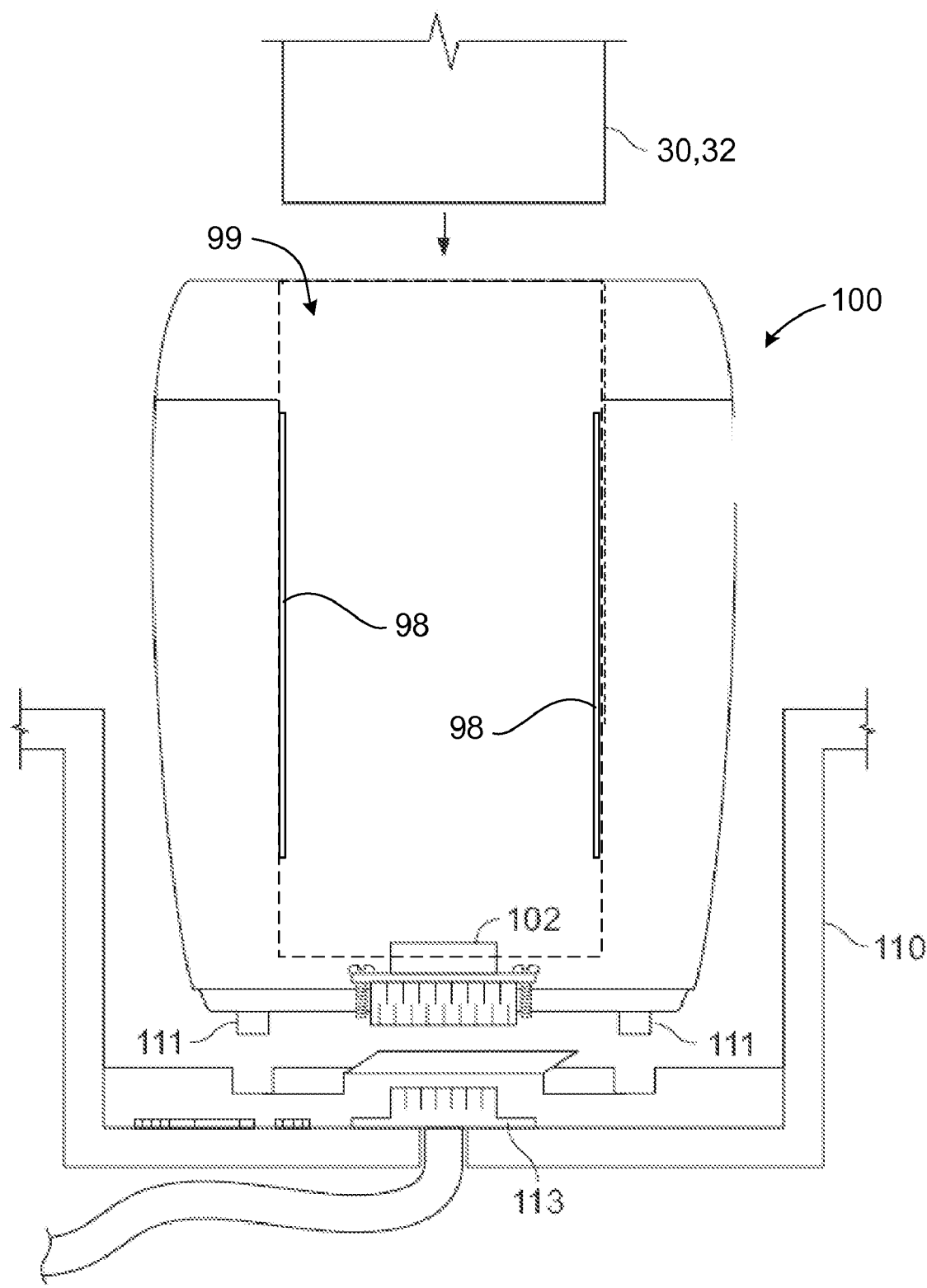
FIG. 26 is a side schematic view of a portable media player holder received in a media system frame.

In FIG. 26, the portable device 30 is being received by the opening 99 of the can-type holder 100. The can-type holder 100 is being inserted into the receiving unit receptacle 110 of the vehicle media system 2. In the example shown, the holder connector 102 is configured to mate with the received portable device 30 in the can-type holder 100. The connector 102 is also configured to mate with the receptacle connector 113 when the can-type holder 100 is inserted into the receiving unit receptacle 110. In some implementations, guides 111 disposed on the bottom of the can-type holder 100 may be used to help align the connectors 102, 113. In some examples, the opening or cavity 99 of the can-type holder 100 defines ribs 98 to support the received portable device 30.

Figure 27:
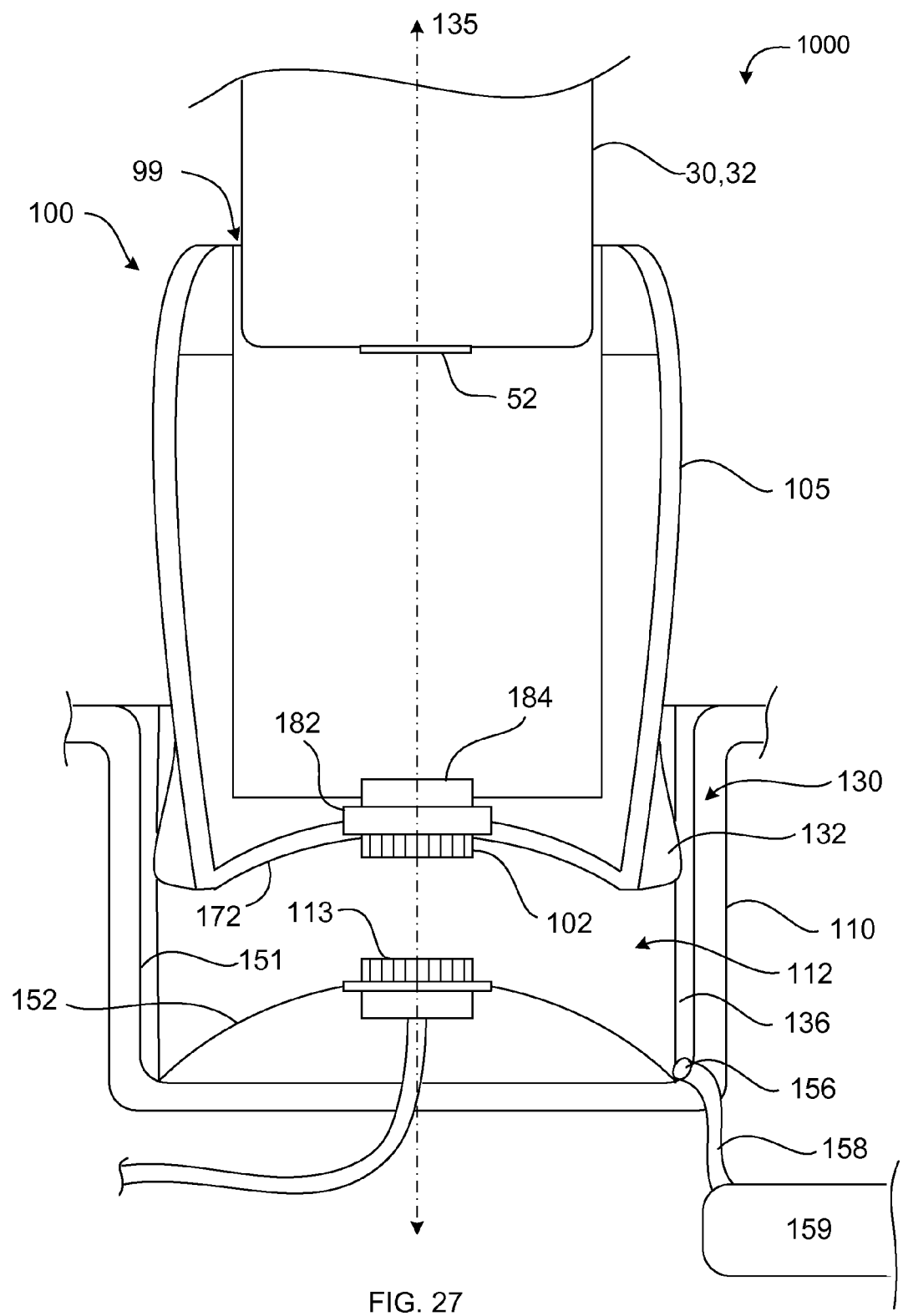
FIG. 27 is a side sectional view of a portable media player holder having a concave bottom surface received in a media system frame having a convex bottom surface.

In the example illustrated in FIG. 27, depicting a portable device interfacing system 1000, the portable device 30, optionally carried by the portable device case 32, is being received by the opening 99 of the can-type holder 100. The can-type holder 100 is being inserted into an interior space 112 defined by the receiving unit receptacle 110 of the vehicle media system 2. In this example, the can-type holder 100 includes guide features 132 of the alignment system 130 configured to orient the received portable device holder 32 with respect to the receiving unit receptacle 110 of the vehicle media system 2. The one or more guide features 132 are received by corresponding guide features 136 defined about the interior side surface 151 and/or interior bottom surface 152 of the receiving unit receptacle 110 to correctly align the connector 102 of the can-type holder 100 with a corresponding connector 113 in the receiving unit receptacle 110. Alternatively, or in combination with the example shown, the holder body 105 may define one or more recesses or notches that receive corresponding protrusions in the receiving unit receptacle 110. The guide features 132 may be disposed asymmetrically about the lower portion 134 of the holder body 105 to provide a particular orientation of the can-type holder 100 as the guide features 132 are received by corresponding features 136 defined by the receiving unit receptacle 110. The received can-type holder 100 and its connector 102 are aligned with respect to the receptacle connector 113 in the receiving unit receptacle 110. In some examples, the receiving unit receptacle 110 defines at least two guide features 132 (e.g., ribs, protrusions, and/or grooves) arranged asymmetrically with respect to a mid-plane 135 bisecting the receiving unit receptacle 110. The interior side 151 and/or bottom 152 surfaces of the receiving unit receptacle 110 may define the guide features 132. In some instances, the interior bottom surface 152 defines an asymmetric shape that receives or is received by a corresponding shape defined by the holder body 105.

Referring still to the example in FIG. 27, the holder connector 102 is disposed on a concave bottom surface 172 defined by the can-type holder 100 and is configured to mate with a receptacle connector 113. The holder connector 102 is in electrical connection with the converter circuit 182, which, as described earlier, converts electrical signals or communications between the portable device 30 and the can-type holder 100 to a format or type that is recognized by and compatible with the vehicle media system 2 and vice-versa. The converter circuit 182 is in electrical connection with a coupler 184 configured to mate with the device connector 52 of the specific portable device 30 or portable device case 32 being received in the opening 99 defined by the can-type holder 100. The coupler 184 and the holder connector 102 may be mounted on the same circuit board 182, back-to-back, or on separate circuit boards joined by a link (e.g. ribbon cable) that collectively form the converter circuit 182. The receptacle connector 113 is disposed on a domed/convex bottom receptacle surface 152 that is configured to receive the corresponding concave bottom surface 172 of the can-type holder 100, when it is inserted into the receiving unit receptacle 110.

The interior bottom surface 152 of the receptacle 110 may be domed, raised, or otherwise configured to facilitate the flow of fluid spilled into the receptacle 110 toward a perimeter of the receptacle's bottom surface 152 away from the receptacle connector 113. The receptacle's bottom surface 152 may be configured to cause spilt fluid to drain toward one or more drain holes 156 defined in the bottom surface 152 and/or interior side surface 151 of the receptacle 110. A drain tube 158 in fluid communication with the drain hole(s) 156 carries spilt fluid either to a reservoir 159 or drains to a location exterior of the vehicle. In some examples, the drain tube 158 carries spilt fluid to an air conditioning system drain tube, which drains outside of the vehicle. In other examples, the drain tube 158 carries spilt fluid to a dedicated reservoir 159 located in an interior trim of the vehicle (e.g. in a glove box, center console box, etc) or to a reservoir 159 in the engine compartment or trunk. The reservoir may be emptied when the vehicle undergoes routine maintenance (e.g. oil change, etc). In some examples, the drain tube 158 empties through an opening in the vehicle body to the exterior of the vehicle.

Figures 28, 29:
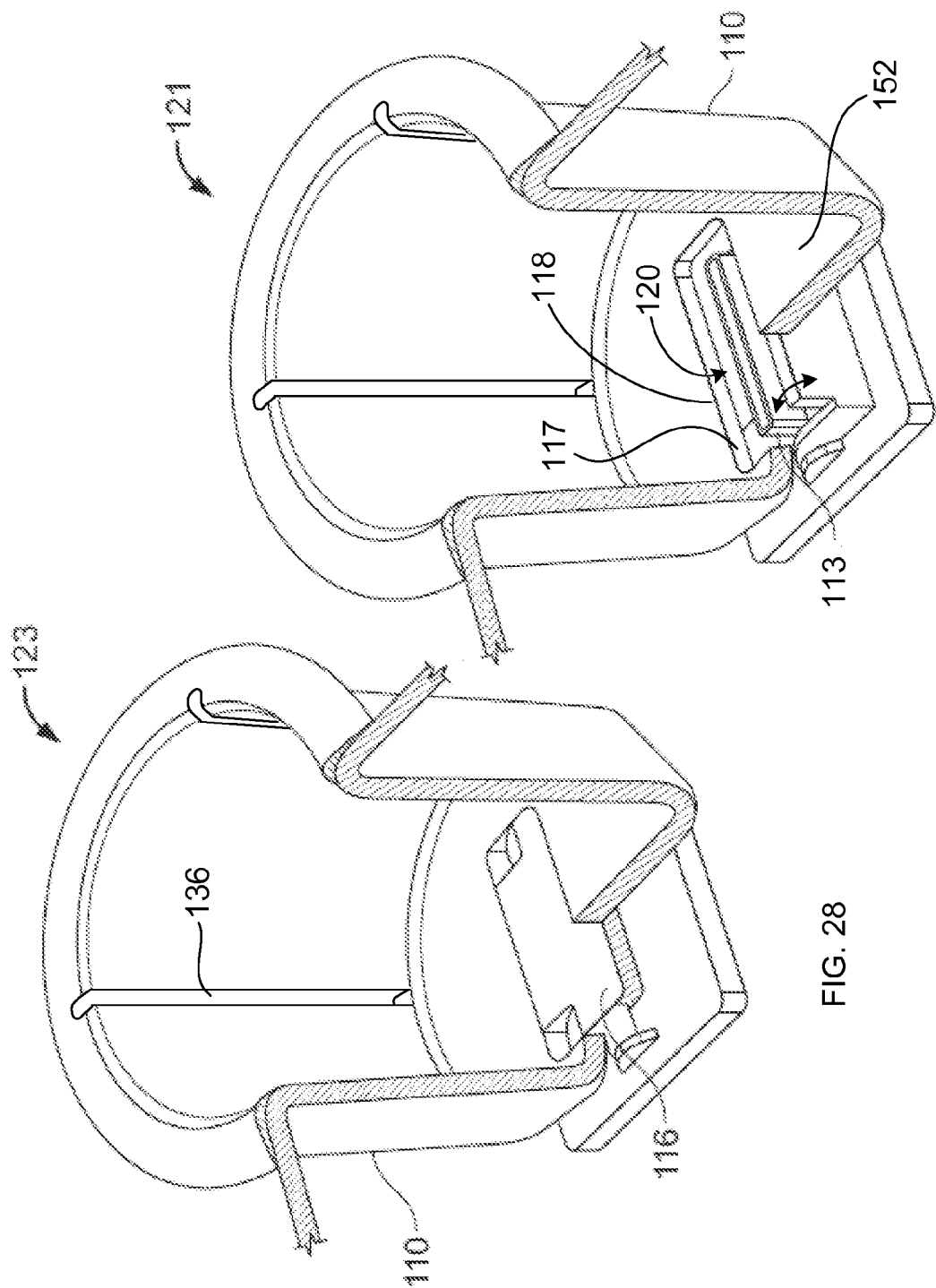
FIGS. 28-29 are perspective sectional views of portable device receiving units, each with an interior bottom door operable to cover a connector.

Referring to FIGS. 28-29, a door or cover 116 is shown covering the receptacle connector 113 housed in a coupler cavity 120 defined by the receiving unit receptacle 110. In some implementations, the receiving unit receptacle 110 has an active state 121, as shown in FIG. 29, and an inactive state 123, as shown in FIG. 28. In the inactive state 123, the door 116 closes over the receptacle connector 113 to protect the connector 113 from fluids and debris. In the active state 121, the door or cover 116 opens to expose the receptacle connector 113 so that the holder connector 102 can be received by the connector 113. In some implementations, the door or cover 116 is mechanically engaged by the tabs 104 on the can-type holder 100 and rotates to expose the receptacle connector 113.

In some examples, a compliant seal 117 is disposed along a perimeter of the cover 116. In other examples, a compliant seal 117 is disposed along a perimeter of an edge 118 of the coupler cavity 120. The compliant seal 117 engages a surface of the closed cover to seal the connector 113 in the coupler cavity 120 from the receptacle 110.

Figure 30:
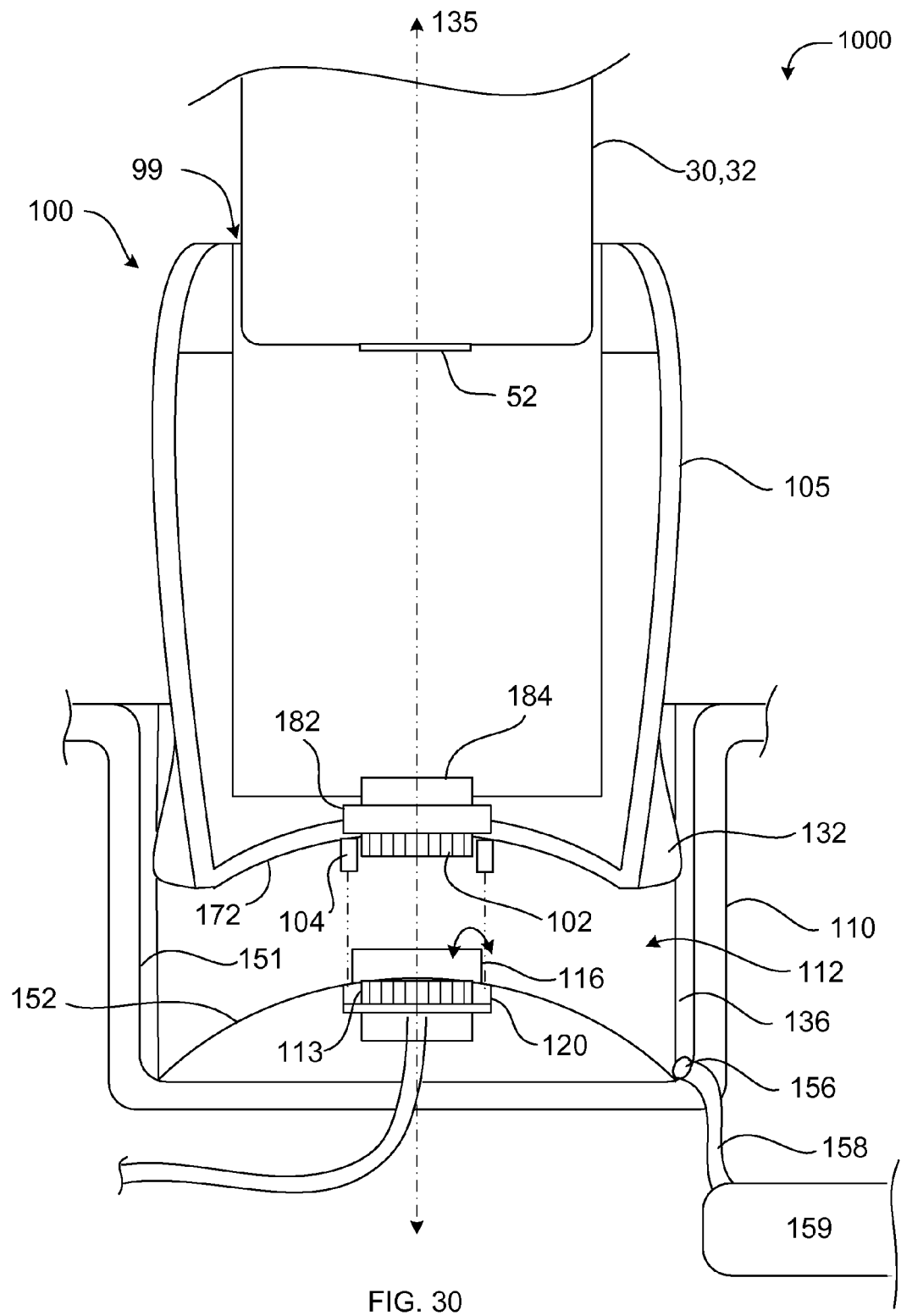
FIG. 30 is a side sectional view of a portable media player holder having a concave bottom surface received in a media system frame having a convex bottom surface and a connector lid.

Referring to FIG. 30, the portable device 30 is being received by the opening 99 of the can-type holder 100. The can-type holder 100 is being inserted into the receiving unit receptacle 110 of the vehicle media system 2. In this example, the receptacle connector 113 is disposed on a domed/convex bottom surface 152 of the receptacle 110 that is configured to receive the corresponding concave bottom surface 172 of the can-type holder 100, when it is inserted into the receiving unit receptacle 110. The received can-type holder 100 has tabs 104 that actuate the door 116 to open. The door 116 is either pivotally or slidably attached to the receptacle bottom surface 152 and covers the receptacle connector 113, which housed in a coupler cavity 120 defined by the receiving unit receptacle 110. When the door 116 is opened, as shown, the receptacle connector 113 is exposed to receive the holder connector 102.

A number of implementations have been described. Nevertheless, it will be understood that various modifications may be made without departing from the spirit and scope of the disclosure. Accordingly, other implementations are within the scope of the following claims. For example, the gobbler unit does not have to enclose the portable device completely to accomplish the connection of the portable device to the vehicle media system. Elements of different implementations may be combined to form implementations not specifically described herein.

What is claimed is:

1. A portable device receiving unit comprising:
   a receptacle defining an interior space configured to receive a portable media player, the interior space having an interior bottom surface that includes an upper portion that extends into the interior space and a lower portion that is below the upper portion; and
   a coupler to provide electrical connection between the portable media player and a vehicle media system, the coupler being disposed on the upper portion of the interior bottom surface;
   wherein the interior space defines at least one drain hole in the lower portion of interior bottom surface.

2. The portable device receiving unit of claim 1, wherein the interior bottom surface defines a generally convex shape and the upper portion is a portion toward the peak of the convex shape and the lower portion is a portion toward the bottom of the convex shape.

3. The portable device receiving unit of claim 1, further comprising a drain tube in fluid communication with the at least one drain hole.

4. The portable device receiving unit of claim 3, wherein the drain tube is in fluid communication with an exterior region outside of a vehicle, the portable device holder being disposed in an interior region of the vehicle.

5. The portable device receiving unit of claim 3, wherein the drain tube is in fluid communication with a reservoir.

6. The portable device receiving unit of claim 1, wherein the receptacle is integrated with an element of interior finish work of a vehicle.

7. The portable device receiving unit of claim 1, wherein the receptacle comprises a cup holder.

8. The portable device receiving unit of claim 1, wherein the receptacle is configured to receive a portable device holder housing the portable media player.

9. A portable device interfacing system comprising:
   a portable device holder comprising:
   a holder body defining a cavity configured to receive a portable media player; and
   a first coupler to provide electrical connection with the portable media player; and
   a portable device receiving unit comprising:
   a receptacle defining an interior space configured to receive the portable device holder, the interior space having an interior bottom surface that protrudes into the interior space; and
   a second coupler to provide electrical connection between the first coupler of the received portable device holder and a vehicle media system, the second coupler disposed on the interior bottom surface;
   wherein the interior space defines at least one drain hole in the interior bottom surface.

10. The portable device interfacing system of claim 9, wherein the interior bottom surface of the receptacle defines as a convex shape to receive a bottom surface of the holder body defined as a concave shape.

11. A portable device receiving unit comprising:
    a receptacle defining an interior space configured to receive a portable media player;
    a coupler to provide electrical connection between the received portable media player and a vehicle media system, the coupler disposed on an interior bottom surface defined by the interior space of the receptacle; and
    a cover pivotally attached to the interior bottom surface and operable to move among an open position exposing the coupler for electrical connection and a closed position separating the coupler from the interior space.

12. The portable device receiving unit of claim 11, further comprising a compliant seal disposed along a perimeter of the cover.

13. The portable device receiving unit of claim 11, wherein the interior space of the receptacle defines a coupler cavity that houses the coupler, the cover configured to cover the coupler in the coupler cavity while in the closed position.

14. The portable device receiving unit of claim 13, further comprising a compliant seal disposed along an edge of the coupler cavity to engage a surface of the closed cover.

15. The portable device receiving unit of claim 11, wherein the receptacle is configured to receive a portable device holder housing the portable media player.

16. A portable device interfacing system comprising:
    a portable device holder comprising:
    a holder body defining a cavity configured to receive a portable media player; and
    a first coupler to provide electrical connection with the portable media player;
    a portable device receiving unit comprising:
    a receptacle defining an interior space configured to receive the portable device holder; and
    a second coupler to provide electrical connection between the first coupler of the received portable device holder and a vehicle media system, the second coupler being disposed on an interior bottom surface defined by the interior space of the receptacle; and
    an alignment system configured to orient the received portable device holder with respect to the receptacle,
    wherein the alignment system comprises at least two guides defined by the holder body and arranged asymmetrically with respect to a mid-plane bisecting the holder body, and
    wherein the asymmetrically arranged guides are configured to orient the first coupler of the received portable device holder with the second coupler.

17. The portable device interfacing system of claim 16, wherein the guides comprises ribs.

18. The portable device interfacing system of claim 16, wherein the alignment system further comprises at least two second guides defined by the interior space and arranged asymmetrically with respect to a mid-plane bisecting the receptacle;
  wherein the asymmetrically arranged second guides are also configured to orient the first coupler of the received portable device holder with the second coupler.

19. The portable device interfacing system of claim 18, wherein the guides comprise ribs.

20. The portable device interfacing system of claim 18, wherein the interior bottom surface defines the guides.

21. The portable device interfacing system of claim 16, wherein the alignment system further comprises a bottom portion of the interior space;
  wherein the bottom portion defines an asymmetric shape to receive a mating portion of the portable device holder; and
  wherein the asymmetric shape is a; sp designed to orient the first coupler of the portable device holder relative to the second coupler.

22. A portable device receiving unit comprising:
a frame configured to receive a portable media player;
connection elements to provide electrical connection between the portable media player and a vehicle media system; and
at least two guides disposed asymmetrically with respect to a mid-plane bisecting the frame to align the received portable media player with the connection elements.

23. A portable device receiving unit comprising:
a receptacle defining an interior space configured to receive a portable media player holder; and
a coupler to provide electrical connection between the received portable media player holder and a vehicle media system;
wherein the interior space defines at least two alignment features asymmetrically positioned with respect to a mid-plane bisecting the receptacle and configured to orient the received portable device holder with respect to the receptacle.

* * * * *